(12) United States Patent
Naber et al.

(10) Patent No.: US 12,222,059 B2
(45) Date of Patent: Feb. 11, 2025

(54) ISOLATION TOOL AND METHODS OF ISOLATING A SECTION OF PIPE OR A VESSEL

(71) Applicant: ENREACH HOT TAP SERVICES INC., Red Deer (CA)

(72) Inventors: David Naber, Red Deer (CA); Amanjeet Dhaliwal, Edmonton (CA); Alexander Skiba, Edmonton (CA)

(73) Assignee: ENREACH HOT TAP SERVICES INC., Red Deer (CA)

( * ) Notice: Subject to any disclaimer, the term of this patent is extended or adjusted under 35 U.S.C. 154(b) by 0 days.

(21) Appl. No.: 18/115,734

(22) Filed: Feb. 28, 2023

(65) Prior Publication Data

US 2023/0213133 A1     Jul. 6, 2023

Related U.S. Application Data

(63) Continuation of application No. 17/832,526, filed on Jun. 3, 2022, now Pat. No. 11,619,335, which is a continuation of application No. PCT/CA2021/051587, filed on Nov. 8, 2021.

(60) Provisional application No. 63/111,262, filed on Nov. 9, 2020.

(51) Int. Cl.
    *F16L 55/124*     (2006.01)
    *F16L 55/105*     (2006.01)

(52) U.S. Cl.
    CPC ............ *F16L 55/124* (2013.01); *F16L 55/105* (2013.01)

(58) Field of Classification Search
    CPC ..... F16J 15/028; F16J 15/3296; F16L 55/105; F16L 55/124; F16L 55/1283; F16L 55/132; F16L 55/136

USPC ................. 277/328, 337, 338, 342
See application file for complete search history.

(56) References Cited

U.S. PATENT DOCUMENTS

| | | | |
|---|---|---|---|
| 2,164,195 A | 6/1939 | Waltermire | |
| 2,241,526 A | 5/1941 | Rosenkranz | |
| 2,368,928 A * | 2/1945 | King ............... | F16J 15/166 |
| | | | 277/584 |
| 2,610,651 A | 9/1952 | Hahn | |
| 2,694,453 A * | 11/1954 | Longeval ........... | E21B 33/128 |
| | | | 166/173 |
| 2,885,009 A * | 5/1959 | Baker ............... | E21B 33/1216 |
| | | | 277/584 |

(Continued)

FOREIGN PATENT DOCUMENTS

| | | |
|---|---|---|
| CA | 2008039 A1 | 7/1990 |
| CA | 2605728 A1 | 1/2008 |

(Continued)

OTHER PUBLICATIONS

International Search Report and Written Opinion for PCT Application No. PCT/CA2021/051587, dated Feb. 7, 2022.

(Continued)

*Primary Examiner* — Robert K Arundale
*Assistant Examiner* — Richard K. Durden
(74) *Attorney, Agent, or Firm* — Haynes and Boone, LLP

(57) ABSTRACT

The present disclosure provides an isolation tool for isolating a section of pipe or a vessel and methods for isolating a section of a pipe or a vessel. In particular, the present disclosure provides a double isolation and bleed (DIB) isolation tool, for use in line-stopping operations and methods of line isolation employing the isolation tool.

23 Claims, 30 Drawing Sheets

(56) References Cited

U.S. PATENT DOCUMENTS

| | | | | |
|---|---|---|---|---|
| 2,974,685 A | * | 3/1961 | Ver Nooy | F16L 55/136 |
| | | | | 220/236 |
| 3,062,295 A | * | 11/1962 | Hanes | E21B 33/128 |
| | | | | 166/63 |
| 3,215,205 A | * | 11/1965 | Sizer | E21B 33/1295 |
| | | | | 277/342 |
| 3,568,721 A | * | 3/1971 | Ross | F28F 11/00 |
| | | | | 81/448 |
| 3,618,639 A | | 11/1971 | Daley | |
| 3,726,319 A | | 4/1973 | Patterson | |
| 3,834,422 A | | 9/1974 | Larson | |
| 3,946,761 A | | 3/1976 | Thompson | |
| 4,262,702 A | | 4/1981 | Streich | |
| 4,342,336 A | | 8/1982 | Satterwaite | |
| 4,506,706 A | | 3/1985 | Sandmann | |
| 5,209,266 A | | 5/1993 | Hiemsoth | |
| 5,277,253 A | * | 1/1994 | Giroux | E21B 33/127 |
| | | | | 166/187 |
| 5,844,127 A | * | 12/1998 | Berube | F16L 55/132 |
| | | | | 73/49.8 |
| 6,581,642 B1 | * | 6/2003 | Ritchie | G01M 3/2853 |
| | | | | 138/90 |
| 7,240,697 B2 | | 7/2007 | Beebe | |
| 7,464,727 B1 | * | 12/2008 | Larson | F16L 55/11 |
| | | | | 138/92 |
| 7,841,364 B2 | | 11/2010 | Yeazel et al. | |
| 7,866,347 B2 | | 1/2011 | Bowie | |
| 7,992,594 B2 | | 8/2011 | Bowie | |
| 8,042,574 B2 | | 10/2011 | Mellemstrand | |
| 8,122,774 B2 | | 2/2012 | Bowie | |
| 8,267,124 B2 | | 9/2012 | Bowie | |
| 8,307,856 B2 | | 11/2012 | Yeazel | |
| 8,779,568 B2 | | 7/2014 | Do | |
| 8,857,032 B2 | | 10/2014 | Bowie | |
| 8,935,951 B2 | | 1/2015 | Bowie | |
| 8,957,530 B2 | | 2/2015 | Shim | |
| 9,027,602 B2 | | 5/2015 | Bowie | |
| 9,057,447 B2 | | 6/2015 | Bowie | |
| 9,169,956 B2 | | 10/2015 | Bowie | |
| 9,297,716 B2 | | 3/2016 | Bowie | |
| 9,404,613 B2 | | 8/2016 | Bowie | |
| 9,476,522 B2 | | 10/2016 | Bowie | |
| 10,001,220 B2 | | 6/2018 | Bowie | |
| 10,094,479 B2 | | 10/2018 | Odori | |
| 10,094,507 B2 | | 10/2018 | Bowie | |
| 10,207,343 B2 | | 2/2019 | Krokosz | |
| 10,774,975 B2 | | 9/2020 | Bowie | |
| 2006/0260687 A1 | * | 11/2006 | Morrison | F16L 55/1604 |
| | | | | 137/318 |
| 2009/0114302 A1 | | 5/2009 | Yeazel | |
| 2013/0193684 A1 | | 8/2013 | Bowie | |
| 2016/0031638 A1 | * | 2/2016 | Noyon | F16L 55/136 |
| | | | | 220/315 |
| 2019/0390814 A1 | | 12/2019 | McKone | |
| 2020/0309308 A1 | * | 10/2020 | Naber | F16L 55/1141 |
| 2022/0290793 A1 | | 9/2022 | Bowie | |

FOREIGN PATENT DOCUMENTS

| | | |
|---|---|---|
| CA | 2638337 A1 | 1/2009 |
| CA | 2650104 A1 | 7/2009 |
| CA | 2656942 A1 | 9/2009 |
| CA | 2656944 A1 | 9/2009 |
| CA | 2706810 A1 | 12/2010 |
| CA | 2719467 C | 4/2011 |
| CA | 2719478 A1 | 4/2011 |
| CA | 2769738 A1 | 8/2012 |
| CA | 2806212 A1 | 8/2013 |
| CA | 2806214 A1 | 8/2013 |
| CA | 2854963 A1 | 12/2014 |
| CA | 2916686 A1 | 7/2016 |
| CA | 3077285 A1 | 9/2020 |
| CA | 3148112 A1 | 2/2021 |
| EP | 2378179 A1 | 10/2011 |
| GB | 904274 | 8/1962 |
| GB | 1364388 A | 8/1974 |
| GB | 2440275 A | 1/2008 |
| GB | 2456229 A | 7/2009 |
| WO | 2014161612 A1 | 10/2014 |
| WO | 2021032967 A1 | 2/2021 |

OTHER PUBLICATIONS

Supplementary Partial European Search Report mailed Jul. 23, 2024, European Patent Application No. 21887968.2, filed Nov. 8, 2021, 16 pages.

* cited by examiner

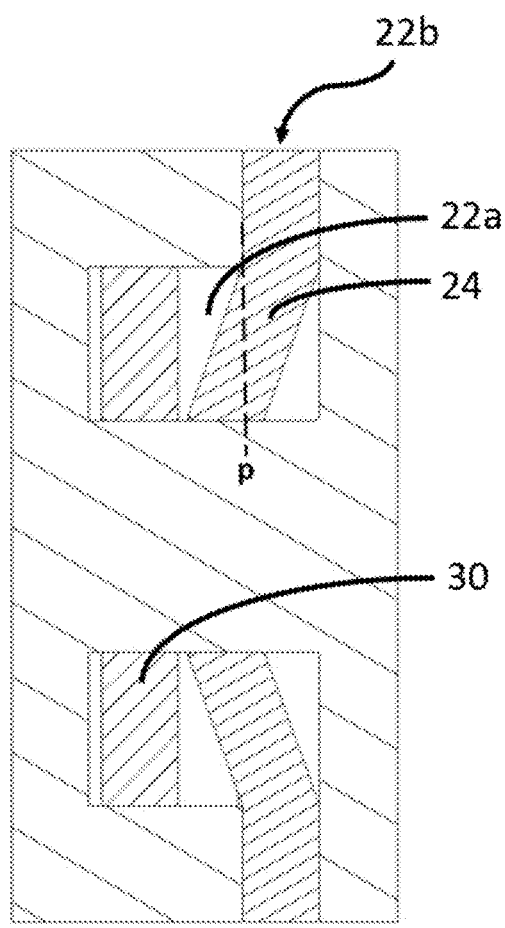
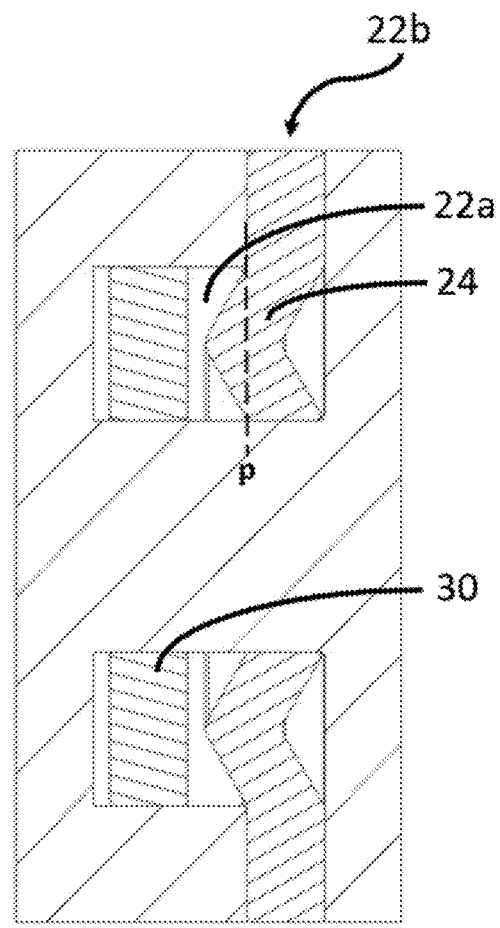
FIG. 17A  FIG. 17B

ISOLATION TOOL AND METHODS OF ISOLATING A SECTION OF PIPE OR A VESSEL

CROSS-REFERENCE TO RELATED APPLICATIONS

This application is a continuation of U.S. application Ser. No. 17/832,526 filed on Jun. 3, 2022, which is hereby incorporated by reference in its entirety, and which is a continuation of International Application No. PCT/CA2021/051587, filed on Nov. 8, 2021, which is hereby incorporated by reference in its entirety, and which claims priority to and benefit of U.S. Provisional Patent Application Ser. No. 63/111,262 filed on Nov. 9, 2020, which is hereby incorporated by reference in its entirety.

TECHNICAL FIELD

The present disclosure generally relates to an isolation tool for use in isolating a section of pipe or a vessel, and for example to a line-stopping tool. In particular aspects, the isolation tool may be a double isolation and bleed (DIB) tool.

BACKGROUND

The isolation of pipes or other types of cylindrical vessels (e.g. tanks) is required in many different industries. Effective isolation tools, particularly those that function under a wide range of pressure conditions in the pipe or vessel (e.g. no pressure, low pressure and high pressure), are required. This is particularly the case for the isolation of operational pipelines.

Pipes and other flow lines, such as those used in the oil and gas industry, commonly require hot-tapping and line-stopping operations to isolate a section of pipe while the pipeline itself remains pressurized.

Hot-tapping, or pressure-tapping, refers to the process of making a connection into a pressurized pipe or vessel using equipment and procedures to ensure that the pressure and fluids are safely contained when access is made. A common example is tapping into a pressurized oil and gas pipeline. Hot-tapping is often performed by fitting a branch connection (e.g. flanged saddle) to the live pipe, whereby the branch connection is fitted with a temporary valve that prevents leakage from the live fluid pipe after tapping (e.g. drilling) into the pipe. The tapping tool itself is configured to prevent leakage during pipe cutting and, upon removal, the temporary valve is closed to complete the branch connection. Line-stopping tools may then be inserted into the live pipe through the hot-tap connection to isolate a downstream region of the pipe from pressures and fluids.

The industry currently utilizes hot-tapping and line isolation techniques to perform a variety of tasks, including pipeline maintenance and repairs. The requirements of a line isolation are defined by various safety and regulatory bodies in which operator guidelines are established. For example, according to the Occupational Health and Safety (OHS) Code in Alberta, Canada (Alta Reg 87/2009), in order to isolate piping or a pipeline containing harmful substances under pressure, an operator is required to use either (a) a system of blanking or blinding or (b) a double-block and bleed isolation system (Section 215.4—Isolating piping). Blanking and blinding are methods of providing a physical barrier to the end of a pipe section or into a cross-section of piping. These methods can only be employed when the section of piping is not in-service.

A double-block and bleed (DBB) system is required, on each upstream side of a pipeline, when the pipeline is in-service and there is potential for the flow of the substance to come from more than one direction. This system involves the use of a three-valve setup where a pipe has two unidirectional block valves (double-block) and an open drain (bleed) valve positioned in between. The closed valves provide a stop in fluid flow, while the bleed valve is used to redirect flow in the event of a valve leak. In situations in which there was no system in place to provide any isolation (e.g. typically DBB valve systems are not in place unless installed during new construction), a DBB line-stopping tool can be used in conjunction with in-service hot-tapping systems to provide temporary isolation of downstream pipe.

In addition to DBB systems, a double isolation and bleed (DIB) system typically seals from pressure from a given direction using two separate bi-directional seals and a bleed positioned in between. In a DIB system, if one seal leaks, the second seal will maintain the seal. Also, since DIB systems having bi-directional seals, they allow for pipeline pressures and fluids to be isolated from both directions.

Several issues exist with conventional line-stopping systems and methods. For one, a basic system with two plugs and a bleed valve does not meet the full criteria of a DBB isolation system. In such systems, the seals require pipeline pressure to actively engage the wall of the pipe, i.e. to become energized. However, when pipeline pressure is against the first plug creating a seal, there is no pressure in the void between the energized seal and the second downstream seal. Therefore, the second downstream seal is not energized (i.e. not engaged against the wall of the pipe) when the first seal is energized. As such, there is no double-block. In such situations, if the energized seal on the first plug fails, there is a high likelihood of the first plug shifting on angle, thereby affecting the alignment of the second plug and causing improper seal engagement with the pipeline and, ultimately, a line stop failure.

For another, in typical plugging machine systems with two plugs, such as the STOPPLE® system by TDW (Tulsa, OK, USA), additional fittings are required to provide the bleed valve, which need to be hot-tapped to the pipeline in between the two seals and remain thereafter. Further, large fittings with two strand plug heads result in a very large installation foot print and limit installation options. Moreover, the large fittings and plug seal cup design complicates removal of the line stop from the pipeline.

As with conventional two plug line-isolation tools, single plug systems involving actuator engagement of multiple seals do not meet DBB (or DIB) isolation system requirements. In such systems, the seals are not engaged independently. Rather, a single actuator operates both seals. If the actuator fails, both seals will fail.

Therefore, a need exists for a line-stopping tool that provides greater safety, functionality and compliance with DBB and DIB criteria, while at the same time being smaller and more flexible in its operation. More broadly, there exists a need for an isolation tool that provides improved operation in sealing a pipe wall or a vessel, with greater safety and greater functionality.

SUMMARY

The present disclosure provides isolation tools and methods for isolating a section of a pipe or a vessel. The present disclosure recognizes that there are problems in the current existing isolation and line-stopping technologies in respect of tools, processes and systems, including in DBB and DIB technologies and tools.

An advantage of the present disclosure is the provision of isolation tools and methods having improved characteristics over existing technologies.

In an embodiment, the present disclosure relates to a head unit for an isolation tool, the head unit comprising: at least one groove around a circumference of the head unit, each of the at least one grooves comprising a first end within the head unit, a second end open to the exterior of the head unit, and a curvature therebetween; and a circumferential seal element disposed within each of the at least one grooves and spanning at least a portion of the curvature; wherein the circumferential seal element is configured within the groove such that a force at or near the first end of the groove imparts radial expansion of the circumferential seal element at the second end of the groove via the curvature in the groove.

In an embodiment, the present disclosure relates to an isolation tool for isolating a section of a pipe or a vessel, the isolation tool comprising: a head unit configured for location in a section of a pipe or a vessel, the head unit comprising: at least one groove around a circumference of the head unit, each of the at least one grooves comprising a first end within the head unit, a second end open to the exterior of the head unit, and a curvature therebetween; and a circumferential seal element disposed within each of the at least one grooves and spanning at least a portion of the curvature; wherein the circumferential seal element is configured within the groove such that a force at or near the first end of the groove imparts radial expansion of the circumferential seal element at the second end of the groove via the curvature in the groove.

In an embodiment, the present disclosure relates to methods of isolating a section of a pipe or a vessel using the isolation tools as disclosed herein.

In an embodiment, the present disclosure relates to a method of isolating a section of a pipe or a vessel, the method comprising the steps of: inserting a head unit of an isolation tool into a pipe or a vessel, the head unit comprising: (i) at least one groove around a circumference of the head unit, each of the at least one grooves comprising a first end within the head unit, a second end open to the exterior of the head unit, and a curvature therebetween; and (ii) a circumferential seal element disposed within each of the at least one grooves and spanning at least a portion of the curvature; and providing a force at the first end of the at least one groove to impart radial expansion of the circumferential seal element at the second end to engage the circumferential seal element against the pipe or vessel and thereby isolate the section of the pipe or vessel.

In an embodiment, the present disclosure relates to a method of engaging a seal against a wall of a pipe or a vessel, the method comprising imparting a linear force within a fixed space and in an axial or tangential direction to a circumferential seal element, to impart radial expansion of the circumferential seal element via a curvature within the fixed space.

In an embodiment, the present disclosure relates to a locking mechanism for a line-stopping tool, the locking mechanism comprising: a circumferential cartridge for engaging a piston or a circumferential seal element of a line-stopping tool, the circumferential cartridge comprising one or more dogs positioned around a circumference of the circumferential seal element and a biasing component for maintaining the one or more dogs in an outwardly biased position; a release ring for engaging the one or more dogs of the circumferential cartridge; and an alignment component for biasing the release ring away from the circumferential cartridge.

Other aspects and embodiments of the disclosure are evident in view of the detailed description provided herein.

BRIEF DESCRIPTION OF THE DRAWINGS

Further advantages, permutations and combinations of the invention will now appear from the above and from the following detailed description of the various particular embodiments of the invention taken together with the accompanying drawings, each of which are intended to be non-limiting, in which:

FIGS. 3A-C illustrate an exemplary circumferential seal element of the present disclosure, wherein FIG. 3A is a perspective view of the seal; FIG. 3B is a top-plan view of the circumferential seal element; and FIG. 3C is a cross-sectional view of the circumferential seal element along the B-B line shown in FIG. 3B.

FIGS. 8A-B illustrate an exemplary core of the present disclosure, wherein FIG. 8A is a perspective view the core and FIG. 8B is a cross-sectional internal view of the core along the C-C line shown in FIG. 8B.

FIGS. 9A-C illustrate an exemplary internal member of the present disclosure, wherein FIG. 9A is a perspective view of the internal member; FIG. 9B is a top plan view of the internal member; and FIG. 9C is a cross-section view of the internal member along the D-D line shown in FIG. 9B.

FIGS. 17A-B are cross-sectional views illustrating exemplary embodiments of a groove with a 90 degree curvature and a circumferential seal element disposed therein in the deactivated state, wherein each of FIG. 17A and FIG. 17B show different types of a circumferential seal element.

FIG. 22A is a perspective view and FIG. 22B is a side view with cross-sectional lines shown.

DETAILED DESCRIPTION

Figure 1:
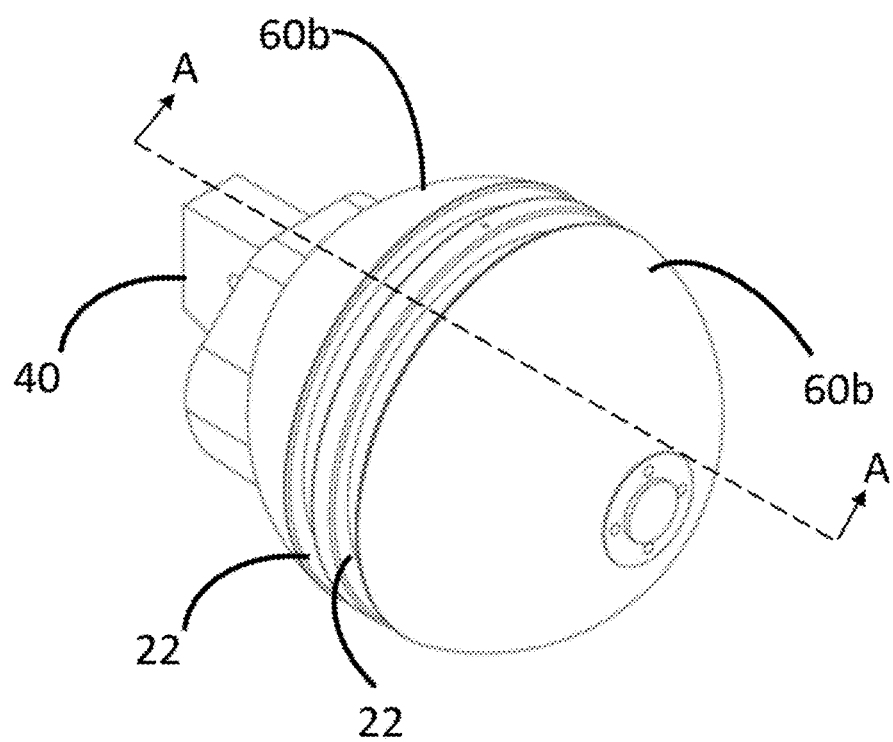
FIG. 1 is a view of an exemplary head unit of the present disclosure.

Unless otherwise defined, all technical and scientific terms used herein generally have the same meaning as commonly understood by one of ordinary skill in the art to which this disclosure pertains. Exemplary terms are defined below for ease in understanding the subject matter of the present disclosure.

Definitions

The term "a" or "an" refers to one or more of that entity; for example, "a circumferential seal element" refers to one or more circumferential seal elements or at least one circumferential seal element. As such, the terms "a" (or "an"), "one or more" and "at least one" are used interchangeably herein. In addition, reference to an element or feature by the indefinite article "a" or "an" does not exclude the possibility that more than one of the elements or features are present, unless the context clearly requires that there is one and only one of the elements. Furthermore, reference to a feature in the plurality (e.g. circumferential seal elements), unless clearly intended, does not mean that the line-stopping tool or methods disclosed herein must comprise a plurality.

"About", when referring to a measurable value such as an angle, a dimension, and the like, is meant to encompass variations of ±10%, ±5%, ±1%, ±0.5% or ±0.1% of the specified amount. When the value is a whole number, the term about is meant to encompass decimal values, as well the degree of variation just described. It is to be understood that such a variation is always included in any given value provided herein, whether or not it is specifically referred to.

"And/or" refers to and encompasses any and all possible combinations of one or more of the associated listed items (e.g. one or the other, or both), as well as the lack of combinations when interrupted in the alternative (or).

"Comprise" as is used in this description and in the claims, and its conjugations, is used in its non-limiting sense to mean that items following the word are included, but items not specifically mentioned are not excluded.

Isolation Tools and Methods

The technology of the present disclosure may be suitable for several applications of isolating a pipe or a vessel. The present disclosure provides advantageous isolation tools comprising an improved design, and methods of employing the isolation tool. The disclosure herein largely discusses the technology in the context of line-stopping applications, but it will be appreciated that other applications and uses are equally applicable. In this context, reference to a "line-stopping tool" of the present disclosure is intended as an embodiment of the disclosed "isolation tool". The term "line-stopping tool" applies to embodiments for isolating a pipeline.

The present disclosure provides advantageous isolation tools comprising an improved design, and methods of employing the isolation tool. More particularly, the present disclosure provides improved line-stopping tools that, for example, meet double-block and bleed (DBB) requirements, including providing a true DIB line-stopping tool.

As discussed elsewhere herein, several issues and/or inefficiencies exist with conventional isolation tools, systems and methods, for example those used in line-stopping applications. One advantage of the present disclosure is the provision of isolation tools and methods having improved characteristics over existing technologies.

Another advantage of the present disclosure is the provision of isolation tools that optionally provide two independently activated and monitored circumferential seal elements on a single head unit. The circumferential seal elements may be activated individually and completely independently from each other. Moreover, the pressure and sealing engagement of each of the circumferential seal elements may each be monitored and tested throughout operation. This ensures the safety of any personnel, for example that may need to work downstream of a line-stop location.

Another advantage of the present disclosure is the ability to pressure test the circumferential seal elements after activation to ensure that the equipment is in place and the intended isolation is achieved. If for some reason a sealing engagement was not obtained, the present isolation tool allows for detection of this fault, deactivation of one or multiple circumferential seal elements and subsequent re-activation of the circumferential seal elements without exiting and re-entering the tool from the pipe or vessel, which would cause significant delay. In select embodiments, pressure at a bleed port between the circumferential seal elements may be continually monitored and bled, providing a true DIB line-stopping tool in line-stopping applications.

A further advantage of the isolation tool of the present disclosure is that sealing engagement of the circumferential seal elements is not activated by pipeline pressure and therefore the pressure in the pipeline or vessel does not impact the functionality of the present technology. The isolation tool (e.g. line-stopping tool) of the present disclosure can be used, and the circumferential seal elements engaged against the wall of the pipeline, irrespective of whether pipeline pressure is present or not. This is quite advantageous since conventional line-stopping tools, which are incapable of creating a sealing engagement on low-pressure systems, may require the pipeline pressure to be increased solely for the purpose of engaging the seals. In contrast, the isolation tools of the present disclosure work irrespective of pipeline pressure (e.g. no pressure, low pressure or high pressure).

A further advantage of isolation tool of the present disclosure is the effectiveness in the design of the circumferential seal element within a curved groove. A non-radial force (e.g. a hydraulic fluid or a mechanical force) causes the circumferential seal element to move within the groove in a manner that, via the curvature, causes a seal portion of the circumferential seal element to expand or grow radially to form a strong and effective sealing engagement with the pipe. Moreover, upon deactivation, the curvature in the groove may further function or aid in pulling the seal portion back into the tool to its original (de-activated) conformation.

A further advantage is that the isolation tools of the present disclosure are capable of being easily and properly aligned in the pipeline. Embodiments of the line-stopping tool disclosed herein minimize loading, and the placement of the pivot point between the carrier unit and arm assembly results in a zero balance load, whereby the head unit cannot rotate in the pipe. A zero moment is formed whereby longitudinal force within the pipe is directed directly up the carrier unit (i.e. the force is turned 90°), preventing rotational movement of the head unit. The zero moment locks the carrier unit into position when line pressure is applied through the seals being activated and allows for higher sealing pressures.

The above advantages allow for the provision of isolation tools that enhance safety and increase efficiency and/or functionality of the tools. In certain embodiments, the result is a pretested and verified DIB line-stopping tool.

Still other advantages and benefits of the isolation tools and methods disclosed herein will become apparent to those skilled in the art upon a reading and understanding of the following detailed description.

As used herein, the term "line-stopping" is intended to refer to isolating a section of pipe within a process pipeline and may be used interchangeably with expressions such as "isolating a pipe" or "pipeline isolation".

It will be understood that reference herein to a "line-stopping tool" is to an apparatus or a system that may be used to isolate a section of pipe within a process pipeline, or a component of the entire system such as the head unit alone which itself functions as a line-stopping tool. As used herein, the "line-stopping tool" may comprise one or any number of components, including the head unit alone or together with one or more of a carrier unit, arm assembly, or other components.

As used herein, the term "isolate" or "isolation" means to plug or stop the flow within a pipe or vessel. In effect, the "isolation" acts to seal off one portion of the pipe or vessel from another portion. In an embodiment, the "pipe" is a process pipeline. By "process pipeline" it is meant to include any pipe that may be used to carry substances, including in particular any fluid-carrying or gas-carrying pipeline. The process pipeline may be a pipeline carrying any type of fluid, gas or chemical, including without limitation oil, gas, natural gas, ammonia, gasoline, alcohol fuels, water, hazardous materials, hazardous waste, waste water, sewage, chemicals or drainage from households, municipalities, manufacturing plants, or food-processing plants. The reference to "pipe" or "pipeline" includes any tubular structure or construction. The pipe may be above ground, below ground, or undersea, or may be any type of downhole tubing. In an embodiment, the "pipe" is a well bore, including for example an uncased well bore. The isolation tool may be installed within a section of pipe at any time, including before the pipeline becomes operational, during operation, or during a period when the pipeline is shutdown.

As used herein, the reference to "vessel" includes any container, such as for example a tank (e.g. a storage tank), of cylindrical or substantially cylindrical shape. The isolation tool of the present disclosure may be installed within a section of a vessel at any suitable time and location.

In an embodiment, the isolation tool disclosed herein is a line-stopping tool, and in particular embodiments a double isolation and bleed (DIB) line-isolation tool. By a "DIB line-isolation tool", it is meant to refer to a line-stopping tool that typically comprises at least two separate and independent bi-directional circumferential seal elements for isolation of a section of pipe, and between the circumferential seal elements is located a bleed valve or conduit to purge pressure, fluid and/or gas if it passes one of the circumferential seal elements. Alternate embodiments of a DIB line-isolation tool are possible.

Reference will now be made in detail to exemplary embodiments of the disclosure, wherein numerals refer to like components, examples of which are illustrated in the accompanying drawings that further show exemplary embodiments, without limitation.

Isolation Tool

The present disclosure provides isolation tools, including a head unit and/or a multi-component apparatus that includes the head unit in association with other components, such as for example a carrier unit and arm assembly.

In an embodiment, the present disclosure relates to an isolation tool for isolating a section of a pipe or a vessel, the isolation tool comprising: a head unit configured for location in a section of a pipe or a vessel, the head unit comprising: at least one groove around a circumference of the head unit, each of the at least one grooves comprising a first end within the head unit, a second end open to the exterior of the head unit, and a curvature therebetween; and a circumferential seal element disposed within each of the at least one grooves and spanning at least a portion of the curvature; wherein the circumferential seal element is configured within the groove such that a force at or near the first end of the groove imparts radial expansion of the circumferential seal element at the second end of the groove via the curvature in the groove.

In an embodiment, the present disclosure relates to a head unit for an isolation tool, the head unit comprising: at least one groove around a circumference of the head unit, each of the at least one grooves comprising a first end within the head unit, a second end open to the exterior of the head unit, and a curvature therebetween; and a circumferential seal element disposed within each of the at least one grooves and spanning at least a portion of the curvature; wherein the circumferential seal element is configured within the groove such that a force at or near the first end of the groove imparts radial expansion of the circumferential seal element at the second end of the groove via the curvature in the groove.

The technology of the present disclosure may be suitable for several applications of isolating a pipe or a vessel. In an embodiment the isolation tool of the present disclosure is a line-stopping tool. With reference below to the drawings herein, the present disclosure largely discusses the technology in the context of line-stopping applications, but it will be appreciated that other applications and uses are equally applicable.

Figure 2:
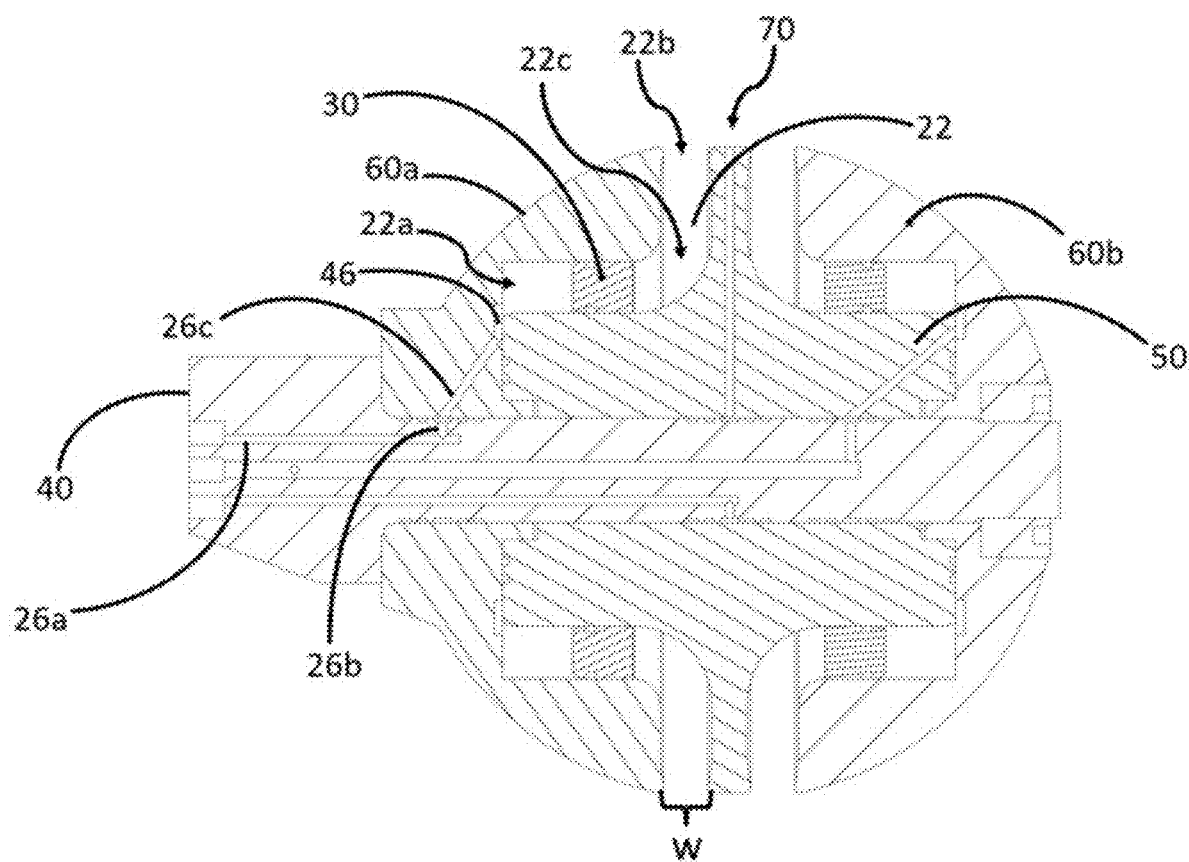
FIG. 2 is a cross-sectional view of a head unit of the present disclosure along the A-A line shown in FIG. 1.

FIG. 1 is an image of an exemplary head unit 20 of the present disclosure and FIG. 2 is a cross-sectional view along the A-A line shown in FIG. 1. As used herein, the term "head unit" is intended to refer to the component of an isolation tool that acts as a plug during isolation of a section of a pipe or vessel such as for example a pipe 200. The head unit is itself a tool for isolation, and is alone encompassed herein by the term "isolation tool", although a complete isolation tool such as for example a line-stopping tool typically includes additional components such as for example a carrier unit and an arm assembly. For ease in positioning the head unit 20 within the pipe 200 or a vessel, a preferred shape for the head unit 20 may be a spherical shape or a cylindrical shape. However, as the skilled person will appreciate other shapes may be employed.

The head unit 20 of the present disclosure may be used in the line-stopping tool 10 as described herein or may be used in other available line-stopping tools, as well as in any other suitable isolation tool such as for example pressure test plugs. In embodiments where the head unit 20 of the present disclosure is used in other tools, it is contemplated that the tools may need to be modified to accommodate the head unit of the present disclosure. This could readily be accomplished by the skilled person having regard to the present disclosure.

The head unit 20 comprises at least one groove 22 around a circumference of the head unit 20 for containing within the groove a circumferential seal element 24. In an embodiment, each groove 22 comprises a first end 22a within the head unit, a second end 22b open to the exterior of the head unit 20, and a curvature 22c therebetween. As used herein, the term "groove" refers to a channel, a cut, or an indentation in an object that is configured to permit another component to move within the defined space and/or be guided by the defined space. In an embodiment, the groove is a fixed structure that does not change in shape or size during operation of the isolation tool (e.g. during activation or deactivation of the circumferential seal element). As used herein, the term "curvature" refers to a portion of the groove 22 that deviates from being linear, including a bend and/or a 90 degree corner. The curvature 22c is positioned between the first end 22a and the second end 22b of the groove 22 and functions as a curve or corner through which at least a portion of the circumferential seal element 24 travels upon activation and/or deactivation.

As used herein, the term "circumference" is a linear distance around an object such as for example the head unit 20. An object may have a circumference at more than one position, depending on its shape. In an embodiment, the one or more circumferences defining the position of each of the grooves 22 on the head unit 20 are at positions that closely share a common axis with the pipe 200 or vessel when the head unit 20 is located within the pipe 200 or vessel. By "closely share", it is meant that the circumference is not perfectly coaxial with the pipe 200 or vessel as the axis of the circumference may be angled slightly in relation to the axis of the pipe 200 or vessel. This may be due to the head unit 20 being slightly angled in the pipe 200 or vessel and/or the circumference being slightly angled on the head unit 20.

Figure 14:
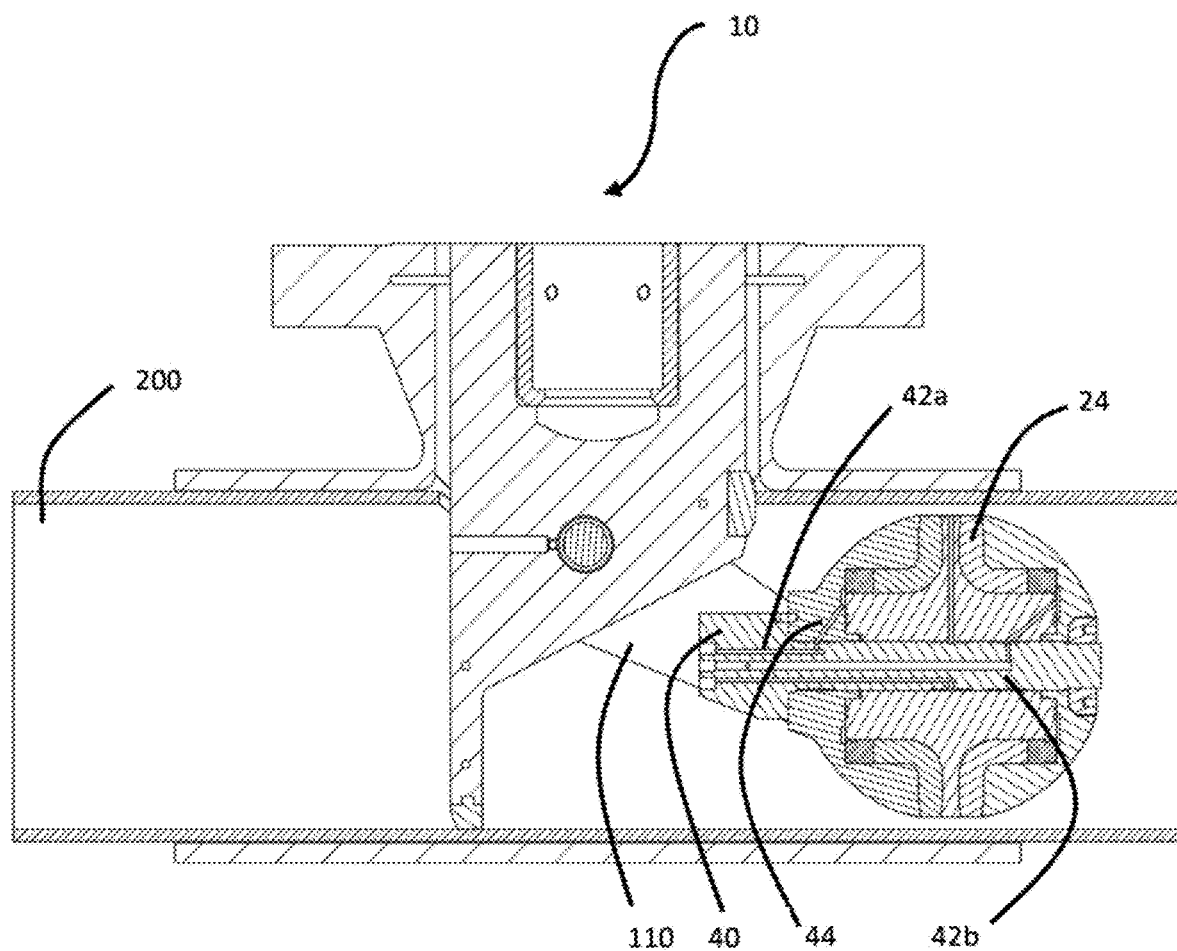
FIG. 14 is a view of the line-stopping tool of the present disclosure in its sealing position in the pipe, prior to a force being applied.

In other embodiments, the one or more circumferences defining the position of each of the grooves 22 on the head unit 20 are at positions that are in coaxial alignment with the pipe when the head unit 20 is located within the pipe 200 or a vessel, e.g. in an activated state. As will be appreciated, by "coaxial alignment" it is meant that the referenced circumference and the pipe are aligned such that they share a common axis of rotation. In this configuration, the pipe circumference encircles the referenced circumference of the head unit 20 and thereby the second end 22b of the groove 22, when the head unit 20 is located within the pipe. By "located within the pipe" it is intended to mean when the head unit 20 is in an operational position in the pipe 200 (e.g. in a position for sealing engagement with the pipe), such as for example as shown in FIG. 14. By "activated state" it is meant that the head unit 20 is in sealing engagement with the pipe 200 or vessel.

In an embodiment, the head unit 20 has at least two grooves, such as for example two, three or four grooves, and in particular, two grooves. In embodiments where the head unit 20 includes more than one groove 22, the circumference defining the position of each groove 22 on the head unit 20 may be spaced apart along the head unit 20 such that each circumferential seal element 24 would engage the pipe at a different position along a length of the pipe. This is for example shown in FIGS. 1 and 14 where the head unit 20 comprises two grooves 22. As discussed elsewhere herein, the inclusion of two grooves 22, each with an independently activated circumferential seal element 24, is of particular relevance to DBB and DIB line-stopping tools. In an embodiment, the two grooves 22 may be configured in a stacked manner such that the curvature of each groove is oriented in the same direction (not shown).

Figure 3A:
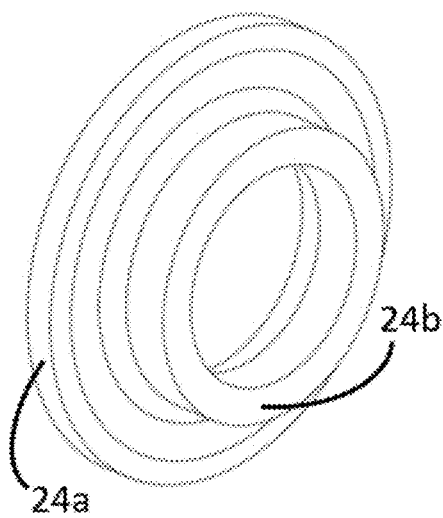
Figure 3B:
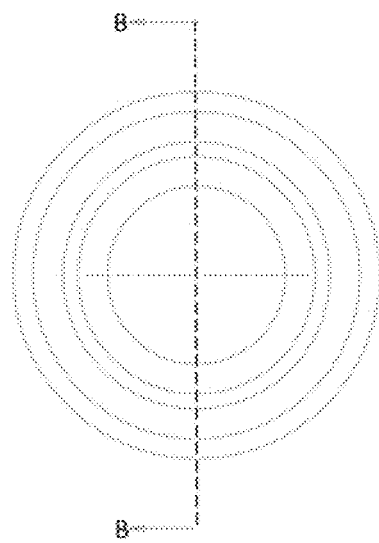
Figure 3C:
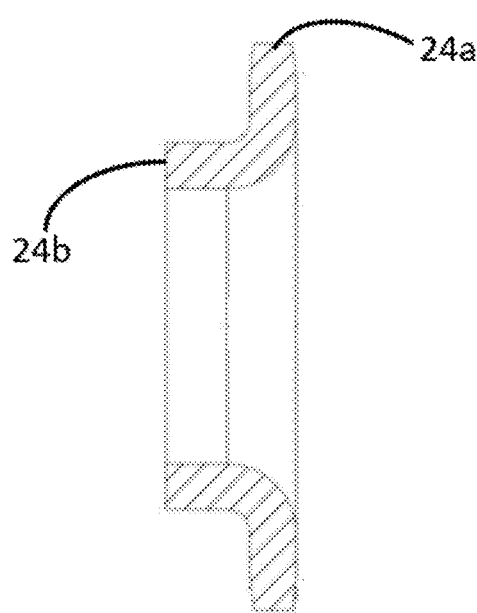

The groove 22 may be of any suitable size to accommodate a circumferential seal element 24 (FIGS. 3 and 14). In an embodiment, the groove 22 has a substantially uniform width (w) from the first end 22a to the second end 22b. In an embodiment, the width is between about 0.5 inches and about 2.5 inches. In an embodiment, the width is between about 0.5 inches and about 1.0 inches. In a particular embodiment, the groove 22 has a width of about 0.5 inches, about 0.6 inches, about 0.7 inches, about 0.8 inches, about 0.9 inches, or about 1.0 inches. In another particular embodiment, the groove 22 has a width of about 0.75 inches.

In an embodiment, the groove 22 narrows at or near the second end 22b. Without being bound by any particular theory, the narrowing of the groove 22 at the second end 22b may cause the second end 22b to act as an extrusion point. In an embodiment, the width of the groove narrows at the second end 22b by between about 0.1 inches and about 0.5 inches as compared to the first end 22a. In an embodiment, the width of the groove 22 narrows at the second end 22b by about 0.1 inches, about 0.15 inches, about 0.2 inches, about 0.25 inches, about 0.3 inches, about 0.35 inches, about 0.4 inches about 0.45 inches, or about 0.5 inches. In an embodiment, the groove narrows at the second end 22b by between about 5 degrees and about 10 degrees over a suitable distance to achieve the desired narrowing. In a particular embodiment, the groove narrows at the second end 22b by about 7 degrees over a suitable distance to achieve the desired narrowing.

The curvature 22c of the groove 22 may be of any suitable angle to provide a non-linear shape or path to the groove 22. The curvature 22c of the groove may be any angle greater than 0 degrees and less than 180 degrees. In an embodiment, the curvature 22c of the groove 22 is between about 60 degrees and about 120 degrees. In an embodiment, the curvature is between about 80 degrees and about 100 degrees. In an embodiment, the curvature is about 80 degrees, about 81 degrees, about 82 degrees, about 83 degrees, about 84 degrees, about 85 degrees, about 86 degrees, about 87 degrees, about 88 degrees, about 89 degrees, about 90 degrees, about 91 degrees, about 92 degrees, about 93 degrees, about 94 degrees, about 95 degrees, about 96 degrees, about 97 degrees, about 98 degrees, about 99 degrees, or about 100 degrees. In a particular embodiment, the curvature is a 90 degree corner.

In an embodiment, the groove 22 has a depth defined by the distance from the second end 22b to the midpoint of the curvature 22c. In an embodiment, the depth is between about 0.5 inches and about 10.0 inches, more particularly 0.5 inches and about 2.5 inches. In an embodiment, the depth is between about 1.0 inch and about 2.0 inches. In a particular embodiment, the depth is about 1.0 inch, about 1.1 inches, about 1.2 inches, about 1.3 inches, about 1.4 inches, about 1.5 inches, about 1.6 inches, about 1.7 inches, about 1.8 inches, about 1.9 inches, or about 2.0 inches. In another particular embodiment, the depth is about 1.6 inches. As will be appreciated, the depth may be any suitable distance within the confines of the configuration of the head unit.

In an embodiment, the groove 22 comprises a length defined by the distance from first end 22a to the midpoint of the curvature 22c. In an embodiment, the length is about 1.0 inch and about 10.0 inches. In an embodiment, the length is between about 2.0 inches and about 3.0 inches. In a particular embodiment, the length is about 2.0 inches, about 2.1 inches, about 2.2 inches, about 2.3, inches, about 2.4 inches, about 2.5 inches, about 2.6 inches, about 2.7 inches, about 2.8 inches, about 2.9 inches, or about 3.0 inches. In another particular embodiment, the length is about 2.25 inches. In an embodiment, the depth and the length of the groove 22 are approximately equal. As will be appreciated, the length may be any suitable distance within the confines of the configuration of the head unit 20.

In an embodiment, the curvature 22c interconnecting the depth and the length of the groove 22 may be defined by a radius of curvature. The term "radius of curvature" refers to the radius of the circular arc that best approximates each of the inner and outer curves of the curvature 22c. In an embodiment, the inner radius of curvature is between about 0.2 inches and about 0.5 inches. In an embodiment, the inner radius of curvature is about 0.2 inches, about 0.3, inches, about 0.4 inches, or about 0.5 inches. In a particular embodiment, the inner radius of curvature is about 0.38 inches. In an embodiment, the outer radius of curvature is between about 1.0 inches and about 1.5 inches. In an embodiment, the outer radius of curvature is about 1.0 inches, about 1.1 inches, about 1.2 inches, about 1.3 inches, about 1.4 inches, or about 1.5 inches. In a particular embodiment, the outer radius of curvature is about 2.35 inches. As will be appreciated, the radius of curvature may be of any suitable dimensions within the confines of the configuration of the head unit 20.

In an embodiment, the at least one groove 22 may have more than one first end 22a (e.g. a split groove). For example, the groove may be of a "Y" configuration whereby there are two first ends 22a and a single second end 22b. In such embodiments, the circumferential seal element 24 (described below) may comprise first and second seal engagement portions 24b disposed respectively within each of the first ends 22a, and the force may be applied at each of the first ends 22a.

In an embodiment, the head unit 20 comprises a single groove 22. In other embodiments, the head unit 20 comprises two grooves 22. In embodiments in which the head unit comprises more than one groove 22, each groove 22 may be of similar shape, size and orientation or may be a different shape, size, and/or orientation. In a particular embodiment, a head unit 20 of the present disclosure comprises two grooves 22 of similar size and shape, but in an opposing orientation within the head unit 20, for example as shown in FIG. 2.

Figure 4:
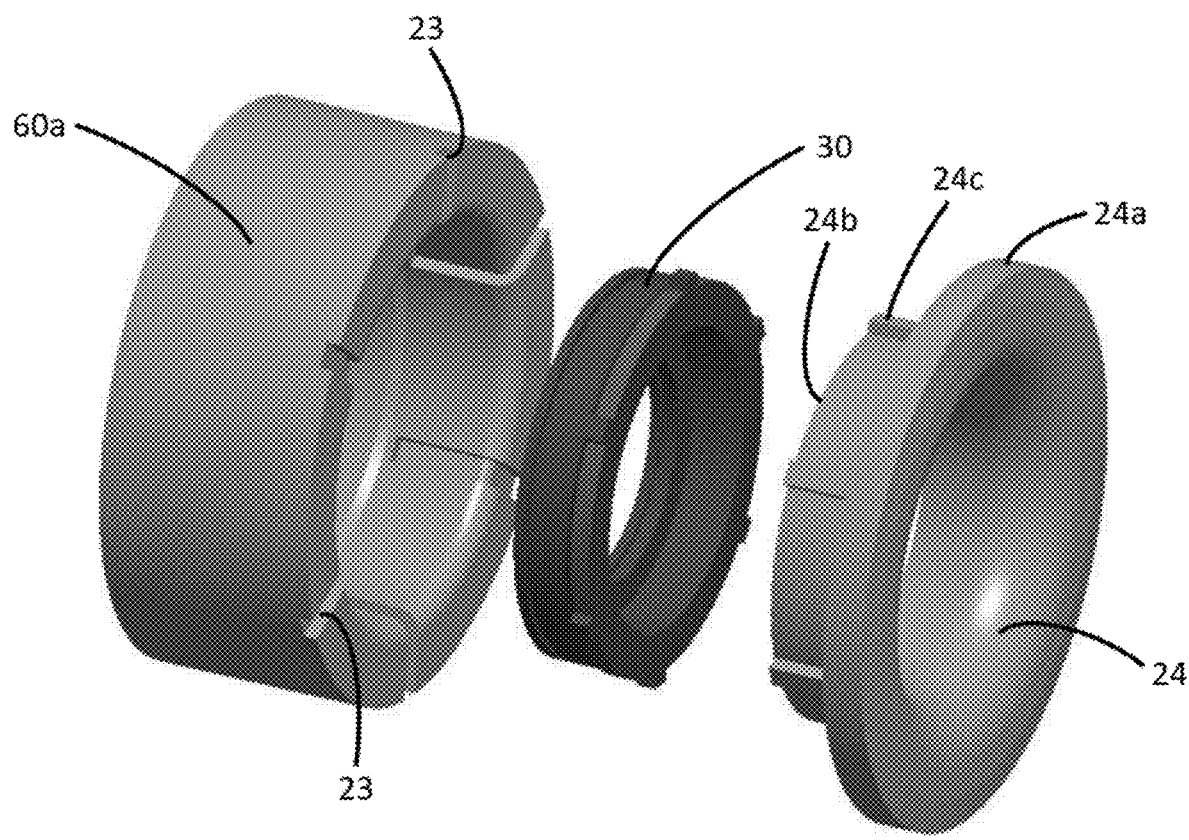
FIG. 4 illustrates an exemplary embodiment of components of an isolation tool of the present disclosure having groove channels into which a portion of the circumferential seal element may extend.

In an embodiment, the groove 22 may further comprises two or more groove channels 23 extending at least a portion of the first end 22a further within the head unit 20, the groove channels spaced apart from each other around the circumference of the groove (see e.g. FIG. 4). The groove channels may function, for example, to provide a channel in which the force may be localized and applied to the circumferential seal element 24 at the first end 22a. The two or more groove channels may be of any suitable shape or size and may extend to any suitable length into the head unit 20. In an embodiment, each of the two or more groove channels may be the same shape, size and/or length, or not. In an embodiment, each of the two or more groove channels are spaced equidistant around the circumference.

In an embodiment, the force at or near the first end 22a of the groove 22 is from within the two or more groove channels. The force may be from within each of the groove channels or may be from within a selected number of the groove channels.

In an embodiment, the curvature 22c of the groove 22 may be formed within the two or more groove channels. In an embodiment, a portion 24c of the circumferential seal element 24 extends within the two or more groove channels. In an embodiment as described in more detail elsewhere herein, the circumferential seal element 24 comprises a seal portion 24a for engaging the pipe and a seal engagement portion 24b for receiving the force. In such embodiments, the seal engagement portion 24b may be disposed within the two or more groove channels.

Disposed within each groove 22 of the head unit 20 is a circumferential seal element 24. As used herein, the term "circumferential seal element" is intended to refer to a sealing component having at least one circumference and may also be referred to as a seal or a ring seal. As will be appreciated, the term "disposed within" indicates that the circumferential seal element 24 is positioned within the groove 22. In an embodiment, a portion of the circumferential seal element 24 may protrude from the second end 22b of the groove 22, even in the deactivated state. In the activated state, radial expansion of the circumferential seal element 24 causes an even greater proportion of the circumferential seal element 24 to protrude from the second end 22b of the groove 22. As used herein, the term "radial expansion" is intended to refer to an outward expansion of the circumferential seal element 24 from the second end 22b of the groove 22 to thereby provide an enlarged outer seal edge for engaging the pipe.

Figure 18:
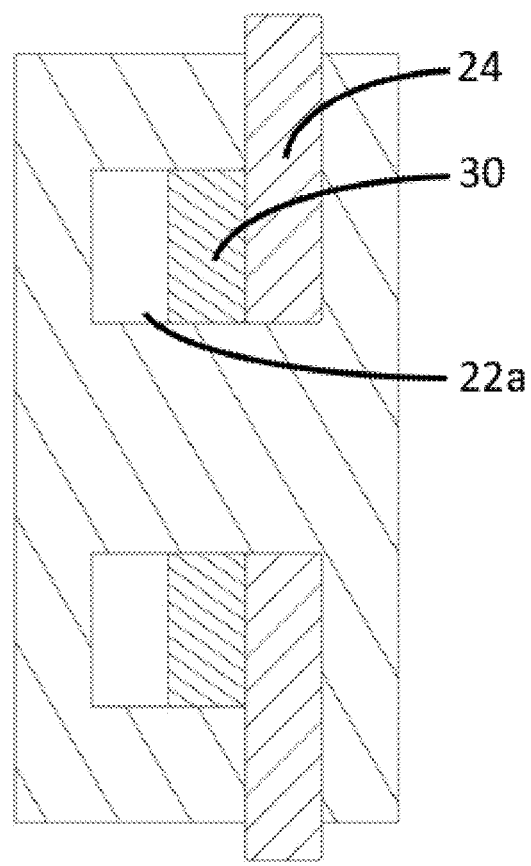
FIG. 18 is a cross-sectional view illustrating the circumferential seal element of either FIG. 17A and FIG. 17B in the activated state.
Figure 19A:
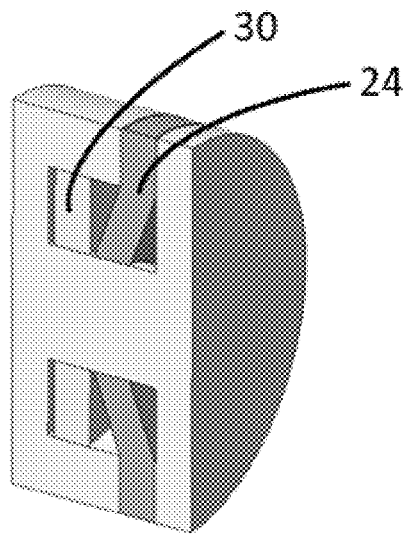
FIGS. 19A and 19B are graphic depictions of the cross-sectional illustrations of FIGS. 17A and 17B, respectively.
Figure 19B:
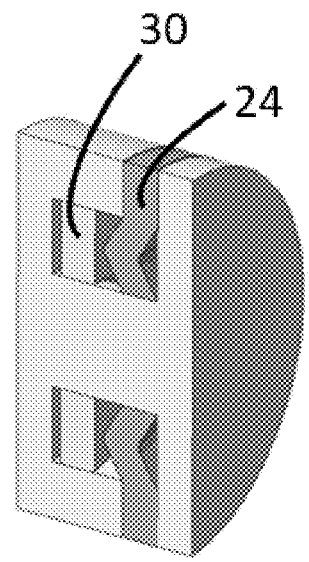
Figure 20:
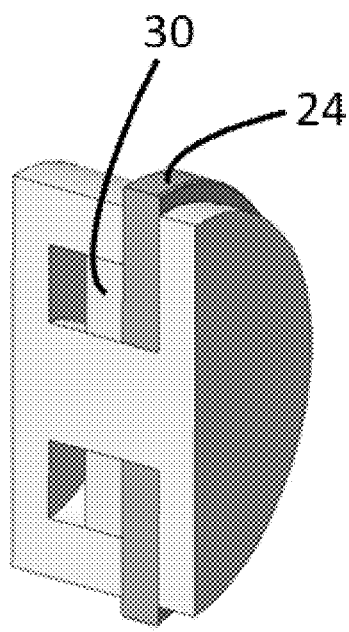
FIG. 20 is a graphic depiction of the cross-sectional illustration of FIG. 18.

Within the groove 22, the circumferential seal element 24 spans at least a portion of the curvature 22c. As used herein, the term "spanning at least a portion of the curvature" is intended to refer to the circumferential seal element 24 being present over either a portion of the full length of the curvature 22c or the full length of the curvature 22c at least when the circumferential seal element 24 is in the deactivated state. In an embodiment, the circumferential seal element 24 spans at least about ⅛, ¼, ⅜, ½, ⅝, ¾ or ⅞ of the full length of the curvature 22c at the end or portion of the curvature 22c proximal to the second end 22b of the groove 22. In a particular embodiment, the circumferential seal element 24 spans the full length of the curvature 22c and extends to the opening at the second end 22b of the groove. In a particular embodiment, the circumferential seal element 24 spans the full length of the curvature 22c, extends to the opening at the second end 22b of the groove 22, and extends beyond the curvature 22c towards the first end 22a of the groove 22. In instances where the curvature is a 90 degree corner, spanning at least a portion of the curvature means that at least a portion of the circumferential seal element 24 extends into the first end 22a at least when the circumferential seal element 24 is in the deactivated state. Exemplary embodiment are shown in FIGS. 17A and 17B where at least a portion of the circumferential seal element crosses plane (p; dashed line) into the first end 22a. FIGS. 17A and 17B show the conformation of a circumferential seal element 24 in a deactivated state. FIG. 18 shows an exemplary change in conformation of the circumferential seal element of FIGS. 17A and 17B when either one is actuated into the activated state by a force at the first end 22a (e.g. a force upon piston 30).

FIG. 3 shows an exemplary embodiment of a circumferential seal element 24 of the present disclosure. In an embodiment, the circumferential seal element 24 comprises a seal portion 24a and a seal engagement portion 24b. As used herein, the "seal portion" refers to the part of the circumferential seal element 24 that sealingly engages the wall of the pipe 200 upon activation of circumferential seal element 24. In an embodiment, the seal portion 24a sealingly engages the wall of the pipe 200 when the seal portion 24a is radially expanded by a force at or near the first end 22a of the groove 22. As used herein, the term "seal engagement portion" is intended to refer to the part of the circumferential seal element 24 that is located proximal to the first end 22a of the groove 22 relative to the seal portion 24a and that is configured for receiving the force. For example, in an embodiment, application of a force against the circumferential seal element 24 at or near the first end 22a of the groove 22 causes the seal engagement portion 24b to move transversely within the groove 22 and, via the curvature 22c, impart radial expansion of the seal portion 24a of the circumferential seal element 24.

Figure 5:
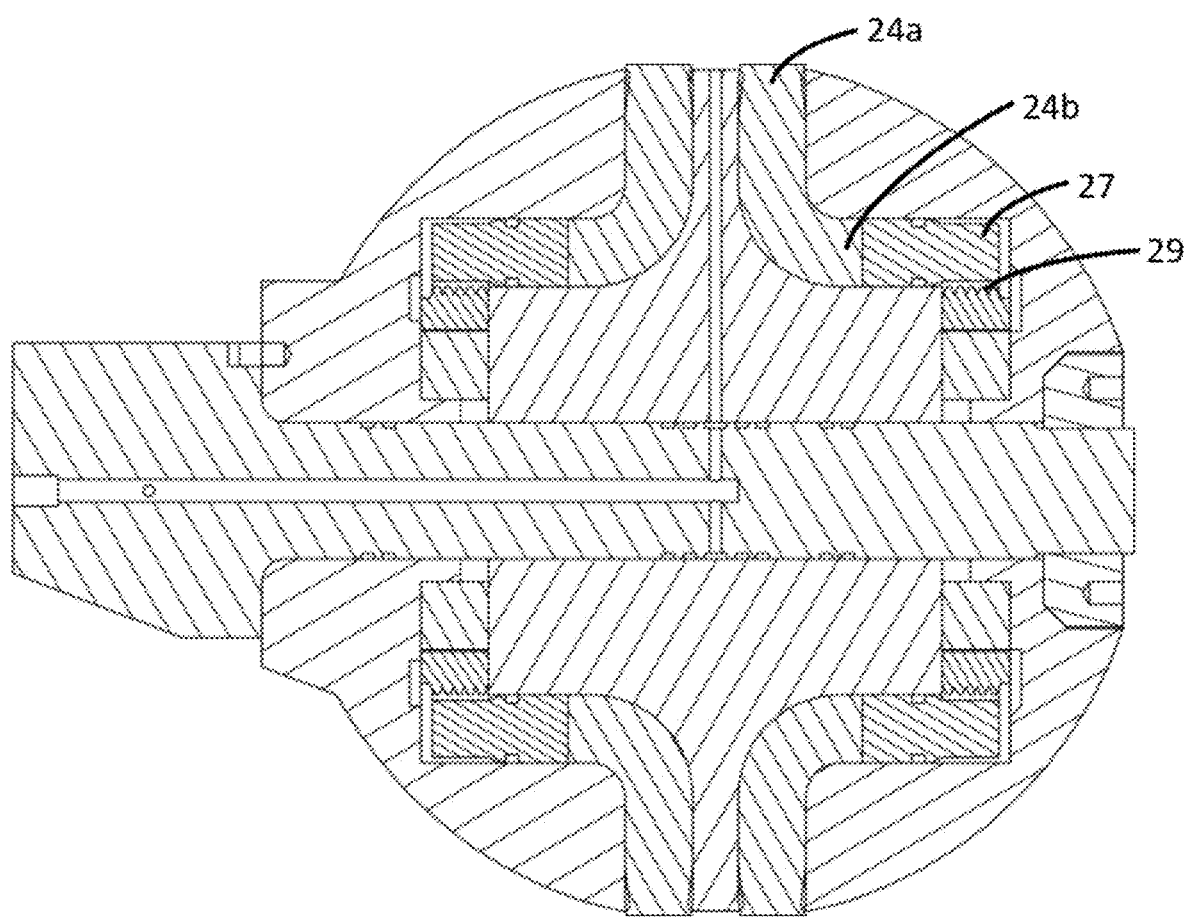
FIG. 5 is a cross-sectional view of a view of an exemplary head unit of the present disclosure having a circumferential seal element disposed therein, whereby the circumferential seal element is a single unit.

In an embodiment, the circumferential seal element 24 is a single unit comprising the seal portion 24a and the seal engagement portion 24b (see e.g. FIG. 5). In an embodiment, the single unit is a monolithic structure. By "monolithic structure", it is meant that the circumferential seal element 24, including the seal engagement portion 24b and the seal portion 24a, is made or formed from a single piece of material. In other embodiments, the seal engagement portion 24b and the seal portion 24a may be made from different pieces of material and then fused or adhered together to form the single unit.

Figure 6:
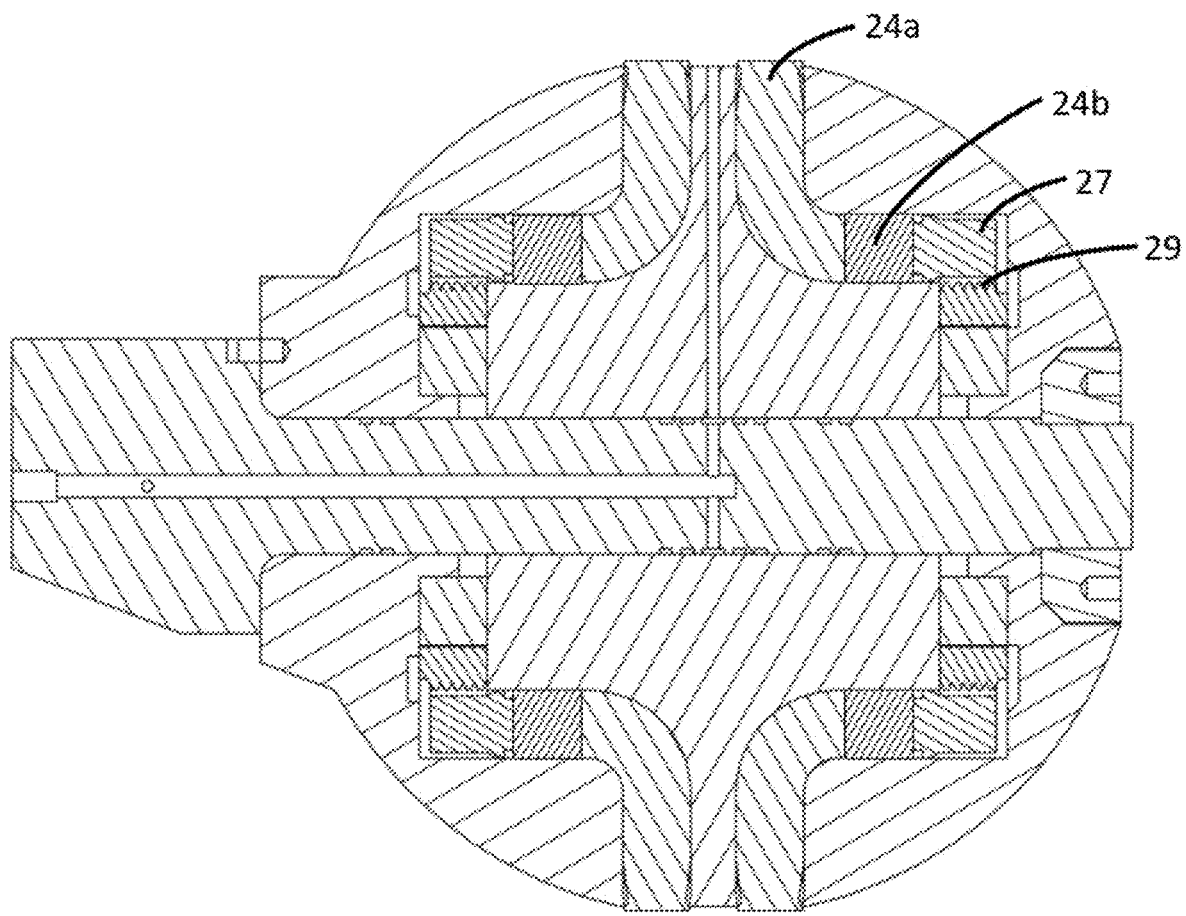
FIG. 6 is a cross-sectional view of a view of an exemplary head unit of the present disclosure having a circumferential seal element disposed therein, whereby the circumferential seal element is comprised of two separate units placed adjacent each other.
Figure 7:
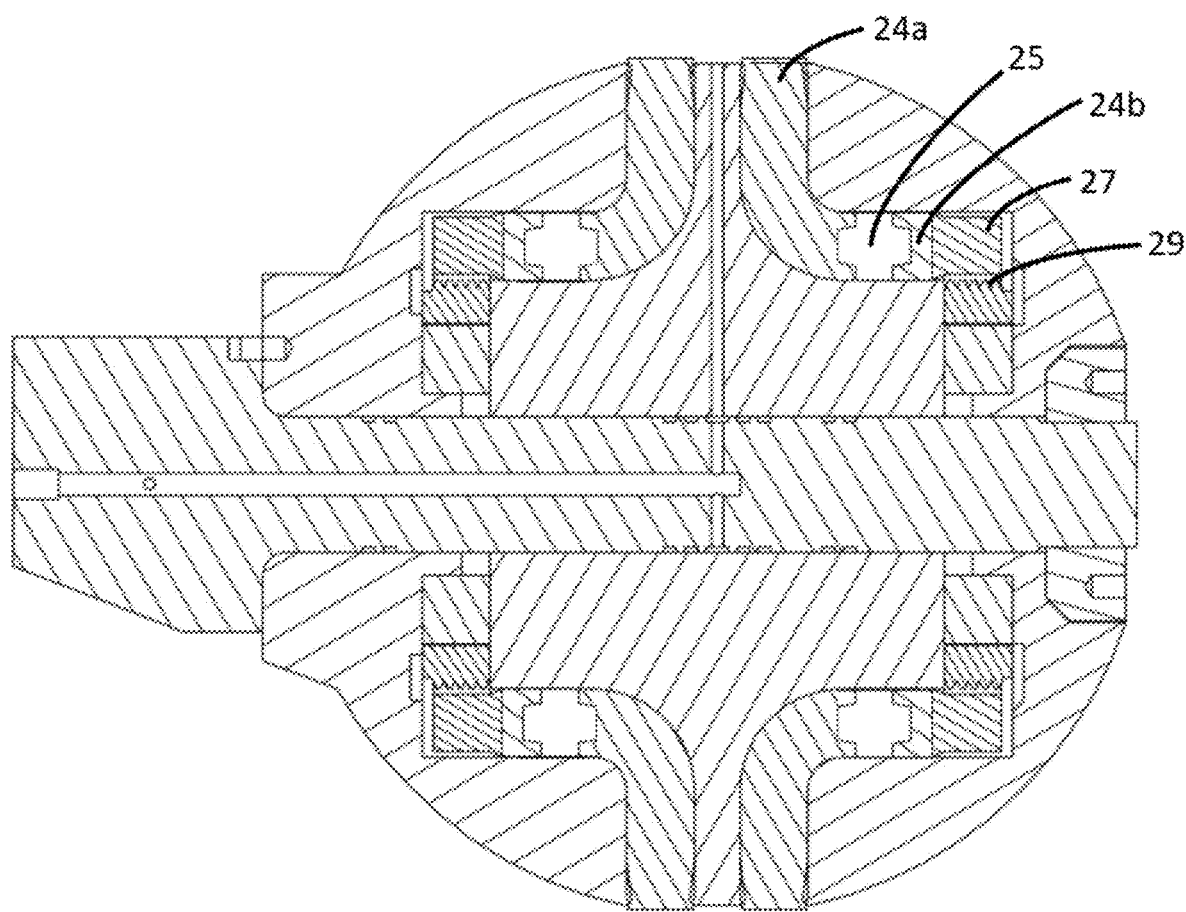
FIG. 7 is a cross-sectional view of a view of an exemplary head unit of the present disclosure having a circumferential seal element disposed therein, whereby the circumferential seal element is comprised of two separate units with a medium therebetween.

In another embodiment, the circumferential seal element 24 is made or comprised of two or more separate and distinct units. In an embodiment, the units may be positioned adjacent to each other within the groove 22 to form the circumferential seal element 24. For example, in an embodiment, the seal portion 24a and the seal engagement portion 24b are formed from more than one piece of material (see e.g. FIG. 6). In such embodiments, the seal portion 24a and the seal engagement portion 24b may be made from the same or a different type of material. In alternate embodiments, the separate and distinct units of the circumferential seal element 24 may be dimensioned to contain a medium 25 therebetween (see e.g. FIG. 7). For example, seal engagement portion 24b and the seal portion 24a may be separated by a medium 25 within the groove, whereby the force acting upon the seal engagement portion 24b is transferred to the seal portion 24a via the medium to impart radial expansion of the seal portion 24a. The medium may be any suitable shape-conforming medium such as, but not limited to, a fluid or grains/beads of material.

The circumferential seal element 24, including the seal portion 24a and the seal engagement portion 24b, may be made of any suitable material that permits sealing engagement against the wall of the pipe. In an embodiment, the circumferential seal element 24 may be comprised of an elastomer or a thermoplastic. More particularly, the circumferential seal element 24 may be comprised of a natural rubber, synthetic rubber, urethane, polyurethane, or an equivalent material thereto. By an "equivalent material thereto", it is meant any material having similar functional properties to natural rubber, synthetic rubber, urethane, or polyurethane in respect of elasticity, hardness and permeability. In an embodiment, the circumferential seal element 24 may be comprised of a soft metal. In an embodiment, the circumferential seal element 24 may be comprised of silicone.

The circumferential seal element 24 may be comprised of a material of any suitable hardness and/or elasticity. In an embodiment, the circumferential seal element 24 is comprised of a material having a Scale D Shore Durometer hardness of at least 80° Sh. In an embodiment, the material has a Scale A Shore Durometer of between about 80° Sh and about 100° Sh. If such a material is to be used, it must be highly resistant to being permanently deformed elastically. Minimally, in embodiments disclosed herein, the modulus of elasticity (Young's modulus) value may be at least 10 GPa. More preferably, the modulus of elasticity may be at least 50 GPa. In an embodiment, the modulus of elasticity may be between about 100 GPa and about 500 GPa.

In an embodiment, the circumferential seal element 24 is comprised of urethane or polyurethane. In a particular embodiment, the circumferential seal element 24 is comprised of polyurethane 90A.

In certain embodiments, the seal engagement portion 24b may be comprised of a material of different hardness than the seal portion 24a. In a preferred embodiment, the seal engagement portion 24b may be comprised of a material of greater hardness than the seal portion 24a. In certain embodiments, the seal engagement portion 24b may be comprised of a material having a higher modulus of elasticity value than that of the seal portion 24a. In an embodiment, the seal engagement portion 24b may comprise a metal or a metallic alloy material at a region or surface that is contacted by the force that is applied when the head unit is activated to sealingly engage the pipe.

In an embodiment, the seal engagement 24b portion and seal portion 24a of the circumferential seal element 24 are dimensioned to contact each other within the curvature 22c of the groove 22 to impart radial expansion of the seal portion 24a. For example, if the circumferential seal element 24 is a single unit comprised of a seal portion 24a and a seal engagement portion 24b of different materials, these materials may interconnect within a region spanning the curvature 22c. If the seal portion 24a and the seal engagement portion 24b are separate units, they may be positioned adjacent to each other within the groove 22 to form the circumferential seal element 24. Irrespective of the configuration, in such embodiments, the force acts on the seal engagement portion 24b, directly or indirectly, such that the seal engagement portion 24b transfers the force to the seal portion 24a to effect radial expansion of the seal portion 24a directly or indirectly.

As will be understood, when the circumferential seal element 24 is a single unit and the seal portion 24a and seal engagement portion 24b are comprised of the same materials, reference to these as different portions (seal versus engagement) is largely a functional distinction, as opposed to a structural distinction.

In an embodiment, the circumferential seal element 24 may comprise an anti-extrusion device or component. In an embodiment, the circumferential seal element 24 may comprise a spring (not shown) at or near the end which, upon activation, sealingly engages the wall of the pipe. The spring may be of any suitable diameter, shape, wire thickness and material. In an embodiment, the shape of the spring is round, square or oval. In an embodiment, the spring is made of metal or a metallic alloy. The spring may itself form a ring within the circumferential seal element 24, going around the circumferential seal element 24 at or near the end which, upon activation, sealingly engages the wall of the pipe. Alternatively, smaller pieces of spring may be appropriately positioned within the seal portion 24a of the circumferential seal element 24. The circumferential seal element 24 may include any number of springs in any number of different positions.

In an embodiment, the spring is a circular spring positioned within the circumferential seal element 24 in co-axial arrangement with the pipe when the head unit 20 is located within the pipe. In an embodiment, the diameter of the spring is larger than the gap formed between the head unit 20 and the wall of a pipe when the head unit 20 is located within the pipe. In this manner, the spring cannot easily be pushed into the gap and the spring will provide additional resistance to the pressures within the pipeline to aid in maintaining a strong sealing engagement by the circumferential seal element 24 against the pipe. Thus, one function of the spring is to prevent the outer region of the circumferential seal element 24 from deforming in a direction parallel to the pipe wall. Additionally, the spring may aid in retracting the seal portion 24a of the circumferential seal element 24 back into the head unit 20 upon deactivation.

In an embodiment, the spring is positioned within the circumferential seal element 24 such that when the head unit 20 is located in position within a pipe, the spring is at a downstream side of the circumferential seal element 24. By "downstream side", it is meant the side of the circumferential seal element 24 that is on the same side as the isolated section of pipe. In contrast, the "upstream side" refers to the side of the circumferential seal element 24 that is on the operational side of the pipeline where fluids and/or gas are to be sealed-off from the downstream isolation section. While orientation of the spring towards the downstream side may be preferred, the spring can be positioned in the upstream side, center or downstream side of the circumferential seal element 24, or any combination thereof in embodiments with multiple springs.

The circumferential seal element 24 may be of any size or shape depending on, for example, the design of each respective groove, the design of the head unit, the inclusion and position of springs, the type of material, the size of the pipe to be sealed, and the conditions within the pipeline (e.g. operating pressures). The circumferential seal element 24 is of sufficient hardness and rigidity to withstand the operating pressures of the pipeline and maintain a sealing engagement with the wall of the pipe. Further, the circumferential seal element 24 is of sufficient resiliency such that it does not permanently deform.

In an embodiment, the circumferential seal element 24 conforms to the shape of the groove 22 at the second end 22b of the groove 22. By "conforms to the shape of the groove", it is meant that the circumferential seal element 24 is shaped to conform with and/or be in contact with the walls of the groove 22 in the defined region (e.g. at the second end 22b). In an embodiment, the circumferential seal element only conforms to the shape of the groove at the second end (see e.g. FIGS. 17A and 17B). In other embodiments, the circumferential seal element 24 conforms to the shape of the groove 22 over its entire distance within the groove 22 (see e.g. FIG. 14).

The circumferential seal element 24 is configured within the groove 22 such that a force at or near the first end of the groove imparts radial expansion of the circumferential seal element at the second end of the groove via the curvature in the groove. In an embodiment, the force is a fluid force, a mechanical force, or a combination thereof. The fluid force may be provided by any fluid medium, including a liquid or a gas.

As used herein, the term "force" is intended to refer to an interaction that, when unopposed, will change the motion of an object, the position of an object, or both (the object being, for example, the circumferential seal element 24 and/or a piston 30 as described herein).

As above, the force may comprise or be a fluid force. In such embodiments, to supply force to the circumferential seal element 24, the head unit 20 may comprise a fluid conduit 26 in fluid communication with the first end 22a of the at least one groove 22. By "fluid communication" it is meant that a fluid (e.g. a liquid and/or a gas) is able to pass through the fluid conduit 26 and be delivered at or near the first end 22a of the groove 22, for example from the surface. The fluid conduit may be any passageway capable of transferring a fluid or gas, such as for example a tubing or a channel (e.g. a drilled-out channel in a component of the head unit 20). In an embodiment, the fluid conduit 26 of the head unit forms only a portion of the entire passageway from the source of the fluid medium to the first end 22a of the groove 22. For example, the carrier unit and/or arm assembly (as described elsewhere herein) may also comprise a fluid conduit in fluid communication with the fluid conduit 26 of the head unit 20. Furthermore, depending on the configuration of the head unit 20, the fluid conduit 26 within the head unit may comprise any number of different conduits, such as shown in FIG. 2 as 26a, 26b and 26c.

The fluid conduit 26 is configured for delivering a fluid medium to provide a fluid force at or near the first end 22a of the groove 22 to impart radial expansion of the circumferential seal element at the second end 22b.

In embodiments in which the head unit 20 comprises a single groove 22, one configuration is for the head unit 20 to comprise a single fluid conduit 26 in fluid communication with the first end 22a of the groove 22. However, alternate embodiments may involve configurations in which more than one fluid conduit 26 is in fluid communication with the first end 22a of the groove 22.

In embodiments in which the head unit 20 comprises more than one groove (e.g. two grooves), one configuration is for the head unit 20 to comprise a separate fluid conduit 26 for each groove, such as shown in FIGS. 2 and 12-14. In this configuration, each of the circumferential seal elements 24 can be activated/deactivated independently of each other. However, alternate embodiments may involve configurations in which more than one fluid conduit 26 is in fluid communication with each of the grooves 22, or configurations in which a single fluid conduit 26a (e.g. within the core 40) is in fluid communication with both fluid conduits 26c (e.g. within the internal member 50) that are in fluid communication with the first end 22a of each respective groove 22.

Irrespective of the configuration, the force provided via the fluid conduit 26 acts on the circumferential seal element 24 (e.g. at the seal engagement portion 24b), either directly or indirectly, to effect a radial expansion of the seal portion 24a for sealing engagement against the wall of the pipe. In an embodiment, the force may be applied directly to the seal engagement portion 24b at or near the first end 22a of the groove 22 without any intervening component being present. Alternatively, in other embodiments, the force may be applied indirectly to the seal engagement portion 24b via an intervening component, for example and without limitation a piston 30 disposed within the groove 22 between a port of opening of the fluid conduit 26 and the circumferential seal element 24. In such embodiments, the force causes the intervening component (e.g. piston 30) to contact the seal engagement portion 24b and thereby radially expand the seal portion 24a.

In an embodiment, the piston 30 is a circumferential ring comprised of a metal or a metallic alloy. The metal may be, for example and without limitation, iron, copper, aluminum, nickel, titanium or magnesium, and the metallic alloy may be an alloy of these metals, such as steel. In an embodiment, the piston 30 is made of steel. The steel may be conventional steel or high tensile steel. In an embodiment, the piston comprises an O-ring around its outer surface to aid in blocking the fluid medium from passing to the other side.

Since the seal portion 24a is entirely or largely disposed within groove 22 in the deactivated state, radial expansion upon activation is in the outward direction causing the seal portion 24a to engage the wall of the pipe 200. In embodiments where the groove 22 narrows at the second end 22b, radial expansion of the seal portion 24a may further include an extrusion-type event at the second end 22b of the groove 22. In an embodiment, the amount of radial expansion is between about 0.1 inches and about 1 inch. In an embodiment, the amount of radial expansion is about 0.1 inches, about 0.2 inches, about 0.3 inches, about 0.4 inches, about 0.5 inches, about 0.6 inches, about 0.7 inches, about 0.8 inches, about 0.9 inches, or about 1 inch. By "amount of radial expansion", it is meant to refer to how much the seal portion 24a extends or expands radially in each direction to engage with the pipe 200.

As will be understood, even in the deactivated state a portion of the seal portion 24a of the circumferential seal element 24 may extend out of the second end 22b of the groove 22. However, upon activation, the seal portion 24a is caused to extend or expand outwardly even further.

In an embodiment, the circumferential seal member 24 may be maintained in the activated state by continuous application of force via the fluid conduit 26. In another embodiment, the head unit 20 may further comprise a locking mechanism (not shown) for releasably locking the piston 30 in an activated position or at various different positions during seal activation or deactivation. When locked in an activated position, the locking mechanism can maintain the circumferential seal member 24 in the activated state. When the locking mechanism is engaged in the activated position, the force from the fluid conduit 26 may be removed without disrupting the sealing engagement of the circumferential seal member 24 with the wall of the pipe 200. The locking mechanism may be deactivated at a desired time, for example and without limitation by re-applying force to the piston to release the locking mechanism and restore the piston 30 to a deactivated position. The locking mechanism may be any suitable mechanism for releasable locking the piston 30 in place including, but not limited to, a pin, serrated teeth, split rings, or an outward contact force.

In an embodiment, the radial expansion of the circumferential seal element 24 at the seal portion 24a is reversible upon release of the locking mechanism. An exemplary locking mechanism of the present disclosure is described elsewhere herein.

In an embodiment, the force is provided by a hydraulic fluid. Non-limiting examples of hydraulic fluids include petroleum-based or mineral-based fluids, water-based fluids, and synthetic fluids. In an embodiment, the hydraulic fluid is aqueous. In an embodiment, the hydraulic fluid is an oil. The fluid conduit 26 may also be used to deliver other fluids and gases to the head unit 20, such as a cleaning solution to clean the circumferential seal element 24 after its activation and prepare the circumferential seal element for re-use. In an embodiment, the force is provided by a suitable gas, such as, but not limited to nitrogen or oxygen (e.g. air). In an embodiment, the radial expansion of the circumferential seal element 24 is reversible upon release of the fluid force. In an embodiment, radial expansion at the seal portion 24a of the circumferential seal element 24 of each of two grooves is independently activated by separate fluid conduits 26.

Figure 8A:
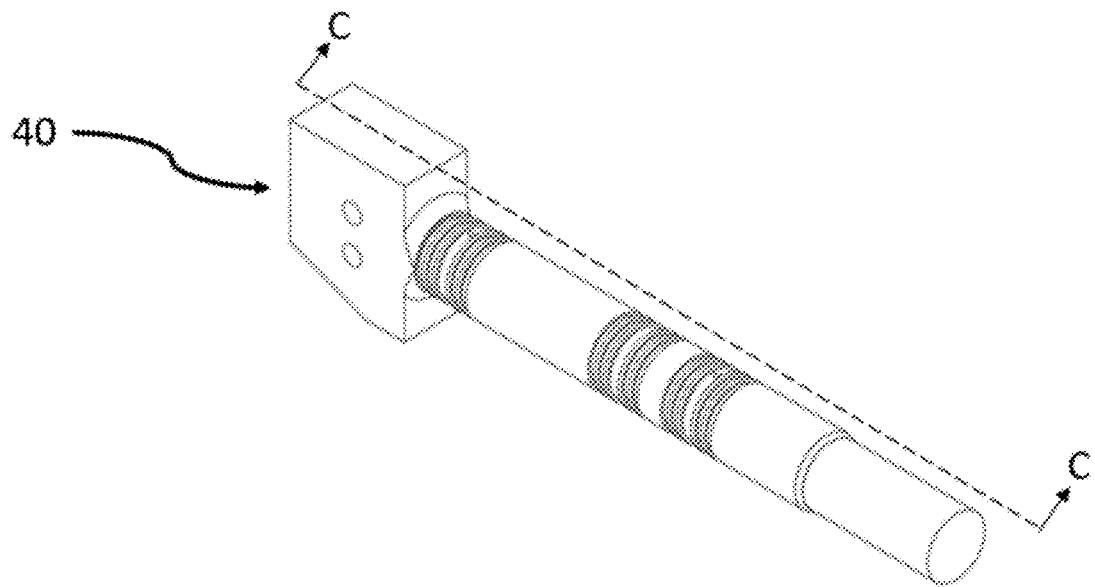
Figure 8B:
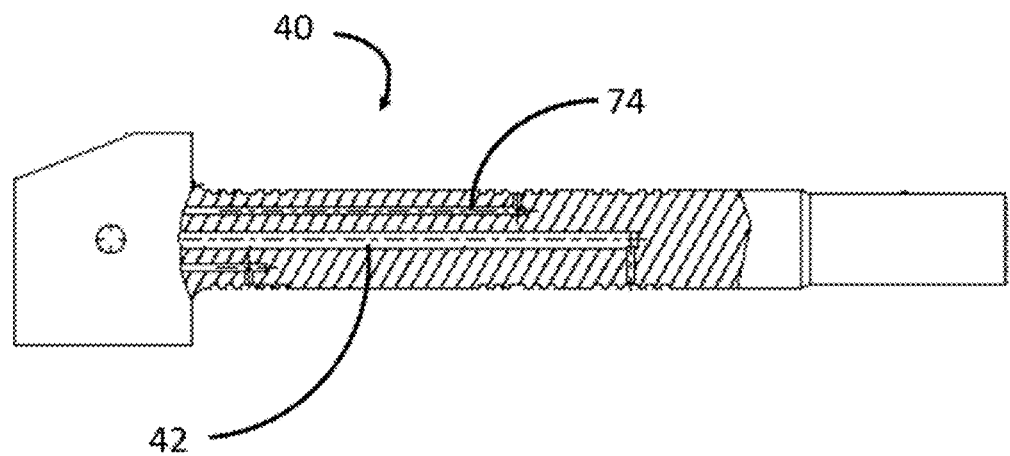

In an embodiment, the head unit 20 comprises a core 40 having a fluid channel 42 (also 26a in FIG. 2), the fluid channel 42 forming at least a portion of the fluid conduit 26 (FIG. 8). As used herein, the term "fluid channel" is intended to refer to a passageway within the solid material of the core or other component, and configured to allow a fluid (e.g. a liquid, a gas, or both) to pass through. In an embodiment, the fluid channel 42 is operatively connected to a tubing or other supply line that runs from the source of the fluid medium to the head unit 20 where there is fluid communication with the fluid conduit 26. Typically, the source of the fluid medium will be external to the line stopping tool 10. Thus, in some embodiments, an external supply line is part of the fluid conduit 26 described herein. In an embodiment, the fluid channel 42 may be a continuous channel in the material of the core 40 formed by any means available in the art, including cutting, grinding, drilling, casting from molten metal (e.g. melting and pouring into a mold), etching, machining, or any combination thereof. In an embodiment, rather than a fluid channel 42, the core comprises a tubing as a fluid conduit, for example that runs through a cavity in the core 40. In an embodiment, the tubing is a braided or non-braided tubing, or any combination thereof. The fluid conduit 26a whether it be a fluid channel 42 or a tubing, may be of any suitable shape and may include any number of fittings, connectors and tubing/channels.

In an embodiment, the core 40 comprises a rod-shape oriented parallel to the pipe when the head unit 20 is located within the pipe, such as shown in FIG. 14. In an embodiment, a portion of the groove 22, spanning from the first end 22a to the curvature 22c, is perpendicular to the core (as shown in FIGS. 2 and 14). In an embodiment, a portion of the groove 22, spanning from the first end 22a to the curvature 22c, is oriented at an angle with respect to the core.

An advantageous aspect of the isolation tool of the present disclosure is that each circumferential seal element 24 in the head unit 20 can be activated and deactivated separately. In such embodiments, the core 40 may include separate fluid channels 42 (42a and 42b in FIG. 14) to provide a force at the first end 22a of each of the grooves 22. As shown in FIG. 14, each of the fluid channel 42a and the fluid channel 42b can use separate and independent passageways in core 40. Moreover, in embodiments where the fluid medium is provided by a hydraulic system, each of fluid channel 42a and fluid channel 42b may use separate hydraulic systems.

Figure 9A:
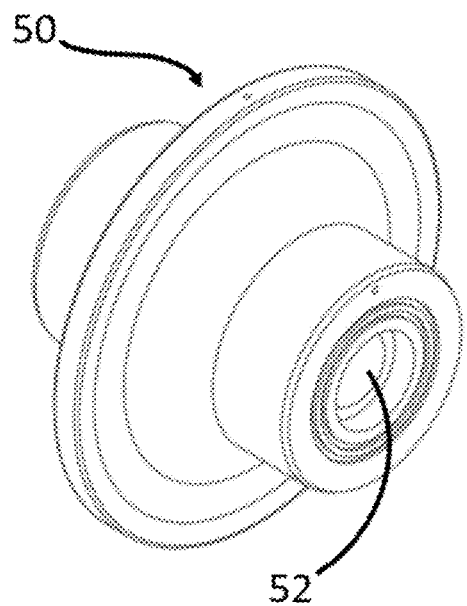
Figure 9B:
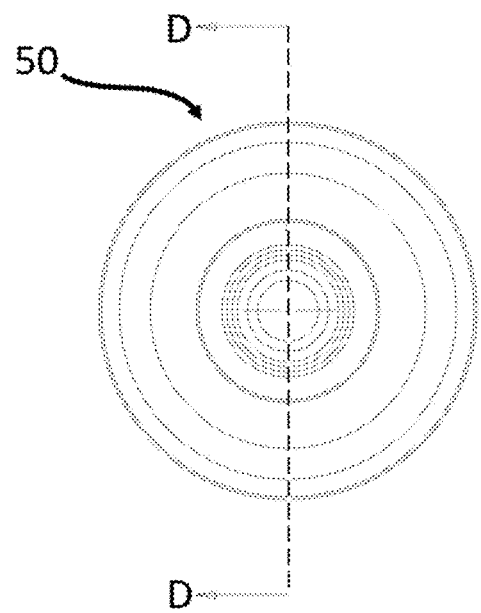

In an embodiment, the head unit 20 comprises an internal member 50 defining a bore 52 to receive the core 40. In an embodiment, the exterior wall of the internal member may define the lower wall 22d of the groove (FIGS. 2 and 9). In an embodiment, the internal member 50 is comprised of metal or a metallic alloy as described elsewhere herein. In an embodiment, the internal member 50 is comprised of high tensile steel such as for example American Iron and Steel Institute (AISI) 4140 steel. In an embodiment, the internal member 50 is of any suitable shape to receive the core 40, and may additionally be of suitable shape to define the lower wall 22d of the groove. In an embodiment, the bore defined by the internal member is cylindrical.

Figure 9C:
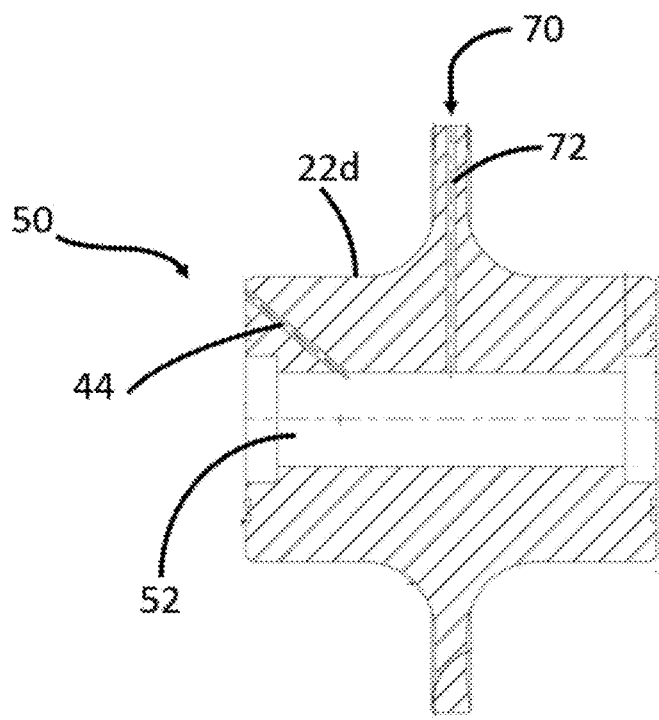

As shown in FIG. 9C, the internal member may comprise a bleed conduit 72. The bleed conduit 72 may open to the exterior of the head unit at a bleed port 70. As described elsewhere herein, the bleed conduit 72 can continuously bleed substances (e.g. fluid, gas, or both) from the exterior space between two circumferential seal elements 24 to the surface, and as well may be used for monitoring the functional of the line-stopping tool. In embodiments where the head unit comprises core 40, the core 40 may comprise a bleed channel 74 as a portion or component of a continuous bleed conduit 72.

In an embodiment, as shown in FIGS. 2 and 9C, the internal member may also comprise a fluid channel 44 that forms at least a portion of the fluid conduit 26 (FIG. 8). In an embodiment, fluid channel 44 may provide a fluid communication between fluid channel 42 (e.g. 42a or 42b) in the core 40 and the first end 22a of the groove 22.

Figure 10A:
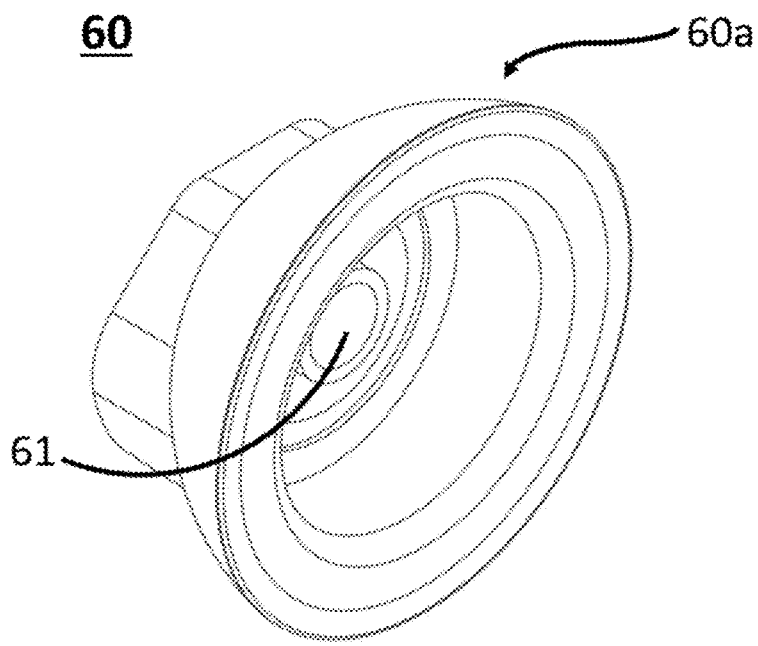
FIGS. 10A-B are views of the first end (FIG. 10A) and second end (FIG. 10B) of an exemplary casing of the present disclosure.

In an embodiment, the head unit 20 comprises a casing 60 having a hole 61 to receive the core. In an embodiment, the casing 60 may comprise two separate parts, namely a first end 60a to be positioned at an upstream end of the head unit 20 and second end 60b to be positioned at a downstream end of the head unit (FIGS. 2 and 10). In an embodiment, the interior walls of the casing may define an upper wall 22e and an end wall 22f at the first end 22a of the groove 22. In an embodiment, the casing 60 is comprised of a metal or metallic alloy as described elsewhere herein. In an embodiment, the casing is comprised of mild steel (i.e. a ferrous metal comprising iron and carbon) or alloy steel. For ease in positioning the head unit 20 within a pipe 200, a preferred shape for the casing 60 may be a spherical shape or a cylindrical shape. Therefore, in an embodiment, the first end 60a and the second end 60b come together to form the desired shape of the head unit 20.

Figure 10B:
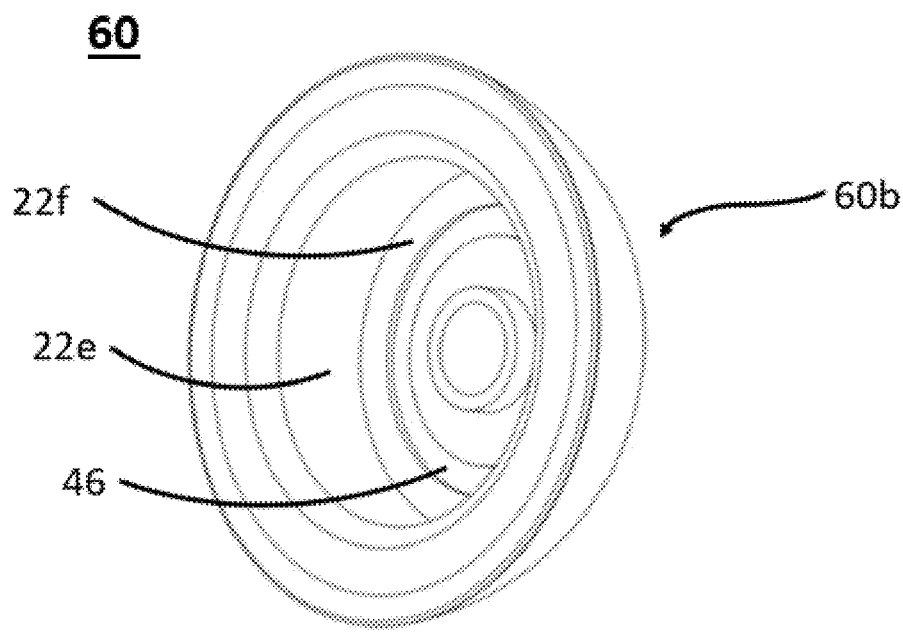

In an embodiment, as shown in FIGS. 2 and 10B, the internal wall of the casing may include a recess 46 that forms a portion of the fluid conduit 26. In an embodiment, recess 46 may provide a fluid communication between fluid channel 44 in the internal member 50 and the first end 22a of the groove 22.

As the skilled person will appreciate from the above, in operation the fluid conduit 26 forms a continuous passageway from the source of the fluid medium to the first end 22a of the groove 22. Because of this arrangement, a fluid medium may pass from the source of the fluid medium to the first end 22a of the groove 22. Here, the fluid medium can accumulate, creating a force (e.g. a pressure) at the first end 22a that acts on the seal engagement portion 24b of the circumferential seal element 24, directly or indirectly, and imparts movement thereto that, through curvature 22c, translates to a radial expansion of the seal portion 24a. In the radially expanded position, the seal portion 24a can engage the wall of the pipe 200.

In some embodiments, in addition to or instead of a fluid force, a mechanical force may be employed to actuate the circumferential seal element 24. The mechanical force may be of any suitable construction, such as for example a mechanically actuated piston. In embodiments employing a mechanical force, the head unit 20 may comprise any of the components described herein in respect of a head unit 20 that employs a fluid force (e.g. a core, internal member, casing, etc.). Modifications to each component to supply the force by mechanical force instead of or in addition to fluid force, would be well understood by the skilled person having regard to the disclosure herein as a whole.

As such, the head unit 20 may be configured in any suitable arrangement to supply the mechanical force. In an embodiment, the head unit 20 comprises a piston disposed within the groove 22 and actuated by a rod to provide the mechanical force. In another embodiment, the head unit 20 may comprise a threaded ring 27 disposed within the at least one groove 22, wherein the threaded ring 27 travels on the threads 29 within the groove 22 to shift the circumferential seal element 24 between an activated and deactivated state (see e.g. FIGS. 5-7). The piston or threaded ring may be comprised of any suitable material, including those described elsewhere herein. In an embodiment, the piston and/or threaded ring are comprised of metal or a metallic alloy. The skilled person will appreciate that other means of supplying the mechanical force may also be used. Similar to as described for a fluid force, the head unit 20 may comprise a locking mechanism for releasably locking the mechanical means of force (e.g. piston or threaded ring) in an activated position or in any other position during seal activation or deactivation.

The line-stopping tool 10 of the present disclosure does not require pipeline pressure to activate the seal. Moreover, as described elsewhere herein, control systems for the line-stopping tool 10 of the present disclosure allow for continued monitoring of the seal engagement, hydraulic pressure, upstream pipeline pressure, and downstream isolation pressure, and also allow for continuous bleed and bleed monitoring, as well as performing a downstream purge. Moreover, because of the design of the seals and the accumulation and maintenance of fluid medium within the first end 22a of the groove 22, advantageous properties are achieved, such as the avoidance of floating because the seal is always centered in the pipe due to even distribution of the radial expansion around the circumference of the head unit.

Other advantages still include the ability to provide a DIB line-stopping tool by including two grooves 22 with independently activated circumferential seal elements 24 disposed therein. In embodiments of a DIB line-stopping tool, the head unit 20 further comprises a bleed port 70 (for example as shown in FIG. 2) open to the exterior of the head unit 20 between the two grooves. The bleed port 70 is configured in fluid communication with a bleed conduit 72 within the head unit 20. In an embodiment, the bleed port 70 can continuously bleed substances (e.g. fluid, gas, or both) from the interior space within the pipe between the circumferential seal elements 24. In operation, the bleed port 70 may be left open and monitored for flow. In alternative embodiments, the pressure within the interior space of the pipe between the circumferential seal elements 24 may be monitored. A sudden spike in pressure may be indicative of a seal leak and the bleed port 70 and bleed conduit 72 may be used to bleed pressure and/or fluid. In an embodiment, this process could be automated such that if the system detects a spike in pressure, a release valve is opened to bleed the pressure and/or fluids. Alternatively, the process could be manual requiring the physical interaction of an operator. Depending on the product within the pipeline, the bleed could be vented or drained to a reservoir or to ambient.

Figure 16:
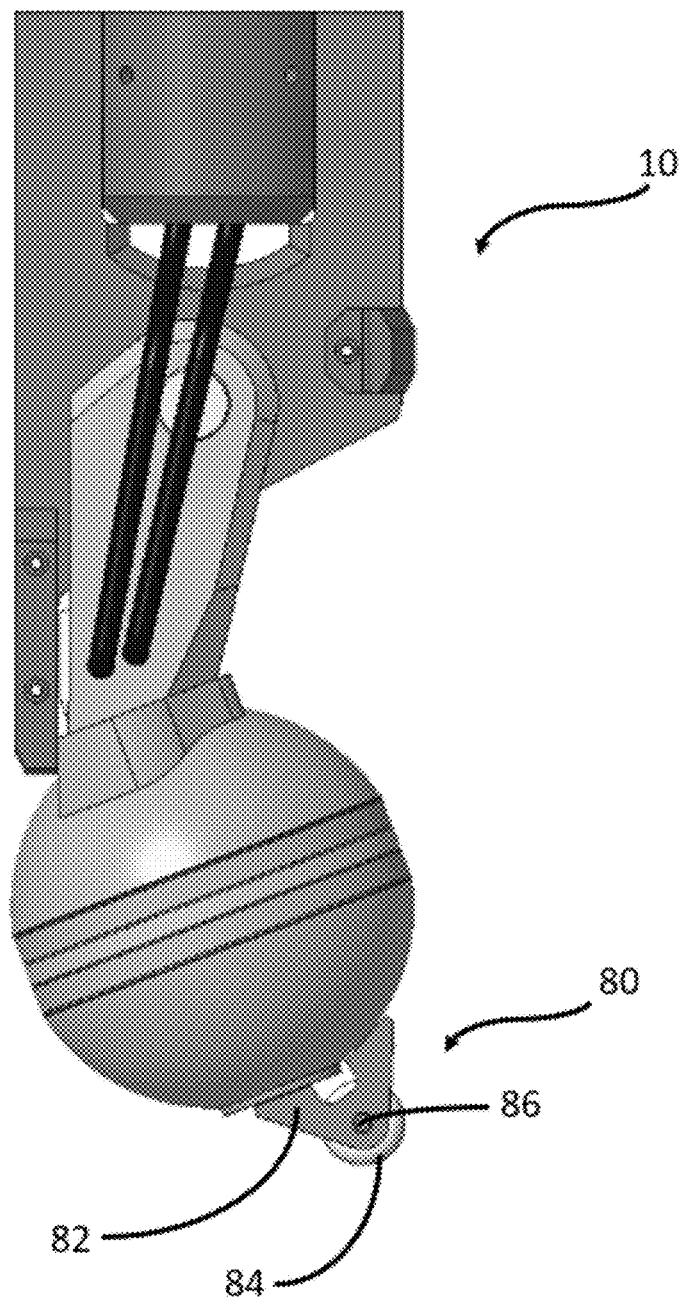
FIG. 16 illustrates an exemplary line-stopping tool of the present disclosure comprising a wheel assembly.

In an embodiment, the head unit 20 may further comprise a wheel assembly 80. FIG. 16 shows an exemplary embodiment of an isolation tool (e.g. line-stopping tool 10) of the present disclosure comprising a wheel assembly 80. In an embodiment, the wheel assembly 80 may be used to guide the head unit 20 in the pipe 200. In an embodiment, the wheel assembly 80 comprises a chassis 82 and one or more wheels 84, each wheel attached to the chassis 82 by an axle 86. The chassis 82 is of a suitable shape to allow the head unit 20 to rotate into position inside the pipe 200, including under no flow service conditions. The wheels 84 can prevent the line-stopping tool 10 from rubbing on the wall of the pipe 200 during positioning, and help the head unit 20 rotate into position inside the pipe, particularly under no flow service conditions. Other wheel assembly structures may also be employed and would be known to the skilled person.

Figure 12:
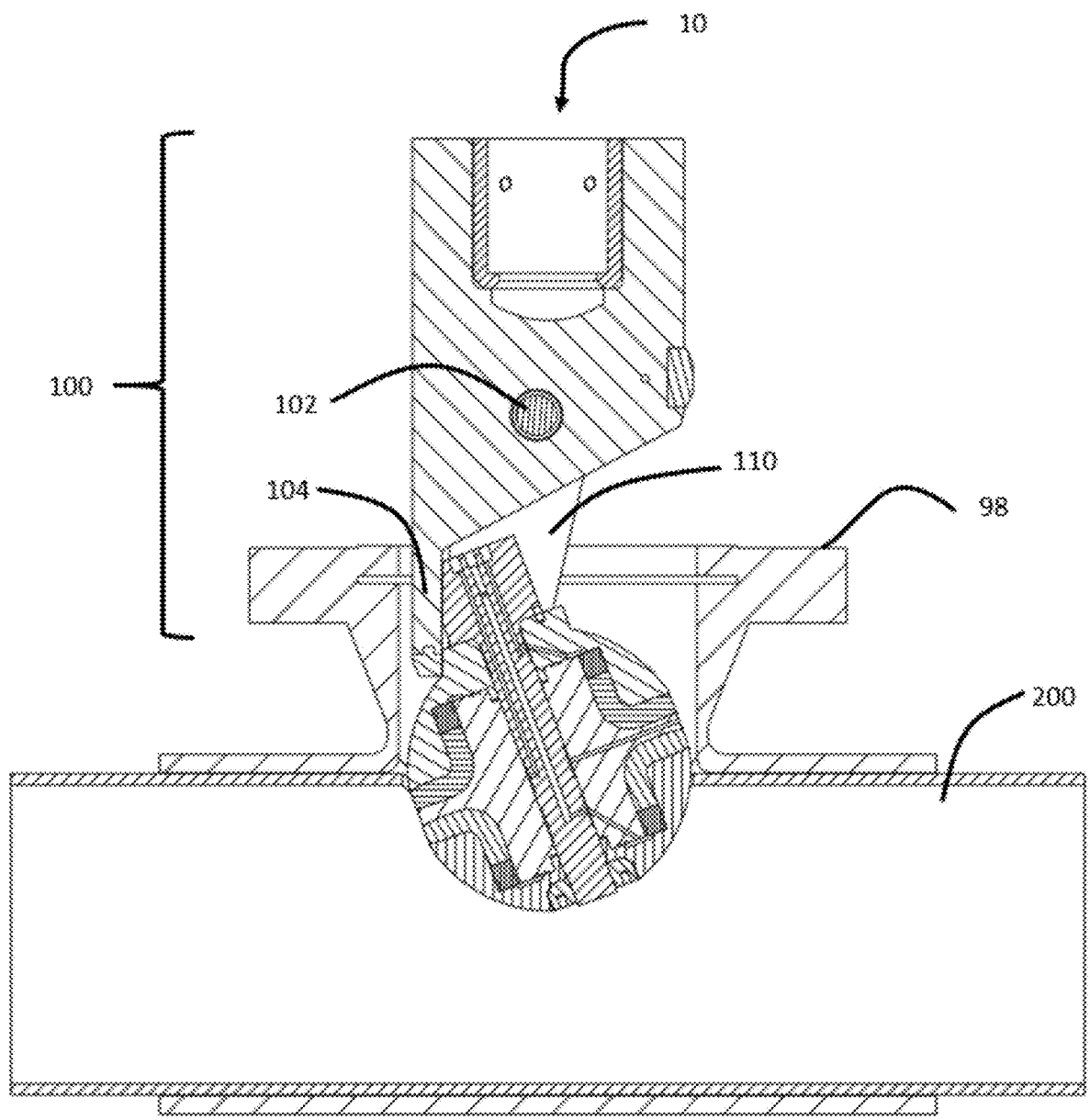
FIG. 12 is a view of the line-stopping tool of the present disclosure as it is being lowered through the opening in the wall of the pipe.

In an embodiment, the line-stopping tool 10 further comprises a carrier unit 100 having a pivotal connection 102 to the head unit 20 (FIG. 12). A purpose of the carrier unit 100 is to connect the line-stopping tool 10 to an apparatus for moving the tool into and out of the pipe. In an embodiment, the apparatus for moving the tool is a ram. In a more particular embodiment, the apparatus is a hydraulic cylinder ram. The body of the carrier unit 100 is of a design to resist and transfer service loads and protect fluid conduit components. In an embodiment, at least part of the fluid conduit components are housed within and pass through an internal bore of the carrier unit 100.

In an embodiment, the pivotal connection 102 is positioned to provide a zero moment on the base 104. By "zero moment" it is meant that there is no rotation about a point of an axis. At least one advantage of having a zero moment on the base 104 is that the base 104 will not rotate, translate, or shift under high pressure. In an embodiment, the carrier unit 100 is pivotally connected to an arm assembly 110 that is connected to the head unit 20. A purpose and function of the arm assembly 110 is to connect the head unit 20 to the carrier unit 100 in a configuration to resist and transfer service loads. The arm assembly 110 may be of any suitable design to allow for pivotal positioning of the head unit 20 into the pipe 200 in relation to the carrier unit 100. In an embodiment, the arm assembly 110 has a smaller girth than the head unit 20 to more readily permit pivotal movement of the head unit 20 into the pipe 200. By "smaller girth", it is meant that the perimeter of the arm assembly 110 around its longitudinal axis is smaller than the perimeter of the head unit 20 around its longitudinal axis. In an embodiment, the girth of the arm assembly 110 is smaller at the end that connects to the carrier unit 100 than at the end that connects to the head unit 20. This design aids in making a 90° corner to position the head unit 20 within the pipe 200.

In an embodiment, the arm assembly 110 is a single piece and may be threaded onto the head unit 20. In another embodiment, the arm assembly 110 is comprised of two separate longitudinal halves. This design may be advantageous for several reasons. For one, being comprised of two halves makes for easy attachment of the arm assembly 110 onto the core 40 of head unit 20 and onto the carrier unit 100 via a pivot pin that passes through respective holes on each half of the arm assembly 110. The skilled person will appreciate that other pivot means are available and could be used in place of a pivot pin. The purpose of the pivot means is to secure the carrier unit 100 to the head unit 20, resist and transfer service loads, and allow the head unit 20 to rotate relative to the carrier unit 100. Other pivot or rotational means that provide these purposes may alternatively be used. For another, being comprised of two halves allows for easy installation within the arm assembly 110 of fluid conduit components, if desired. In this regard, in an embodiment, the arm assembly 110 may comprise an access panel on its external surface with connectors in fluid communication with the fluid conduit components within the arm assembly 110 and head unit 20. The connectors may, for example be female connectors to receive male connectors from the fluid conduit components of the carrier unit 100, or vice versa.

In a further embodiment, the line-stopping tool 10 of the present disclosure may include one or more magnets on or within the head unit 20. The function of the magnets is to capture metal filings and/or debris from the hot-tap procedure. In an embodiment, the magnets may be positioned on opposing ends. Other means of capturing debris from in front of the head unit 20 or sweeping debris out of the sealing zone via bristles may also be used. The head unit 20 of the line-stopping tool is typically narrow to allow for easier bypass capability upon insertion into a pipe, so debris should also be reduced.

The line-stopping tool 10 of the present disclosure may comprise only one circumferential seal element 24 or may comprise one or more circumferential seal elements 24 alone or in combination with another type of seal, on one or more head assemblies.

Referring to FIGS. 11-16, there is shown a line-stopping tool 10 according to an embodiment of the present disclosure. The embodiment in FIGS. 11-16 comprises two grooves 22 on the head unit 20, with a circumferential seal element 24 disposed within each groove, as disclosed herein.

Figure 15:
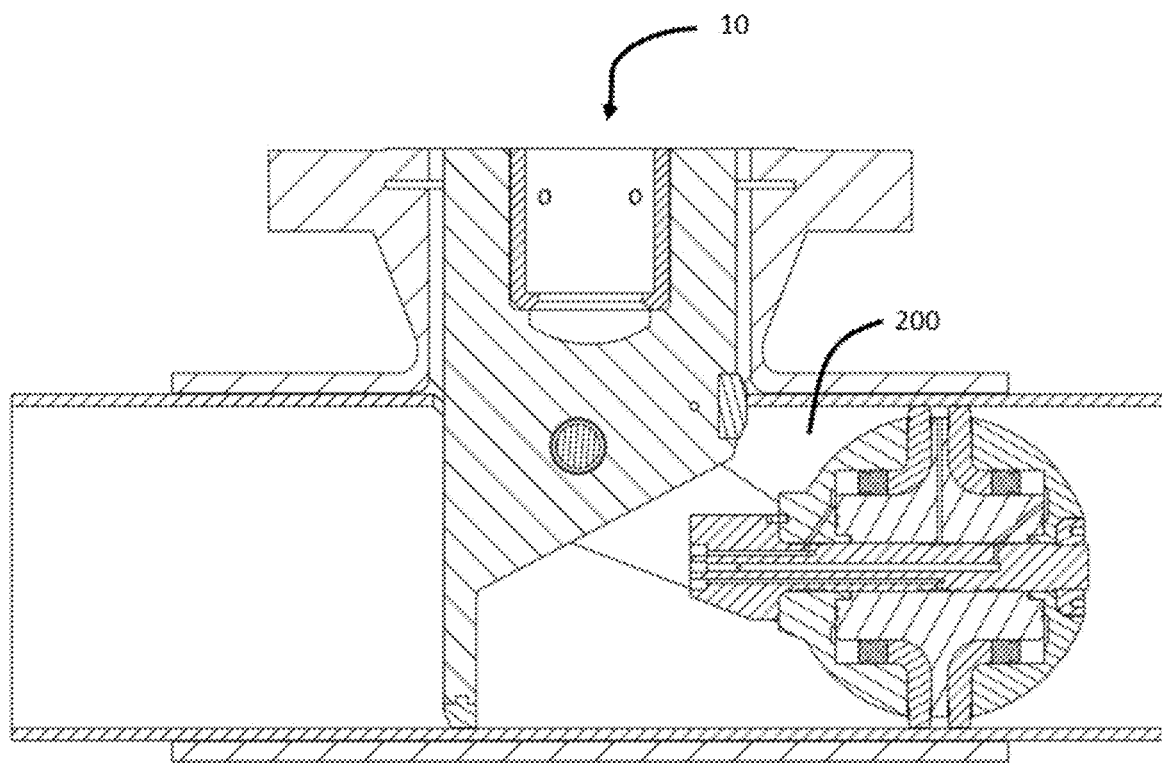
FIG. 15 is a view of the line-stopping tool of the present disclosure in its sealing position in the pipe, after the force is applied (i.e. activated).

In each of FIGS. 11-14, the line-stopping tool 10 is shown prior to activation, whereas in FIG. 15 the circumferential seal elements 24 have been activated. By "activated", it is meant that the seal portions 24a are in a radially expanded state to engage the walls of the pipe. Prior to activation, the seal portions 24a are in a retracted state. As shown in FIGS. 11-15, the line-stopping tool 10 has a head unit 20, a carrier unit 100, and an arm assembly 110. FIG. 12 provides an internal view of an embodiment of a line-stopping tool 10 showing the various fluid conduits (or fluid channels) as described elsewhere herein.

In another embodiment, the present disclosure provides a locking mechanism. The locking mechanism may be used with the line-stopping tool 10 of the present disclosure, other line-stopping tools, or other tools generally.

Figure 21:
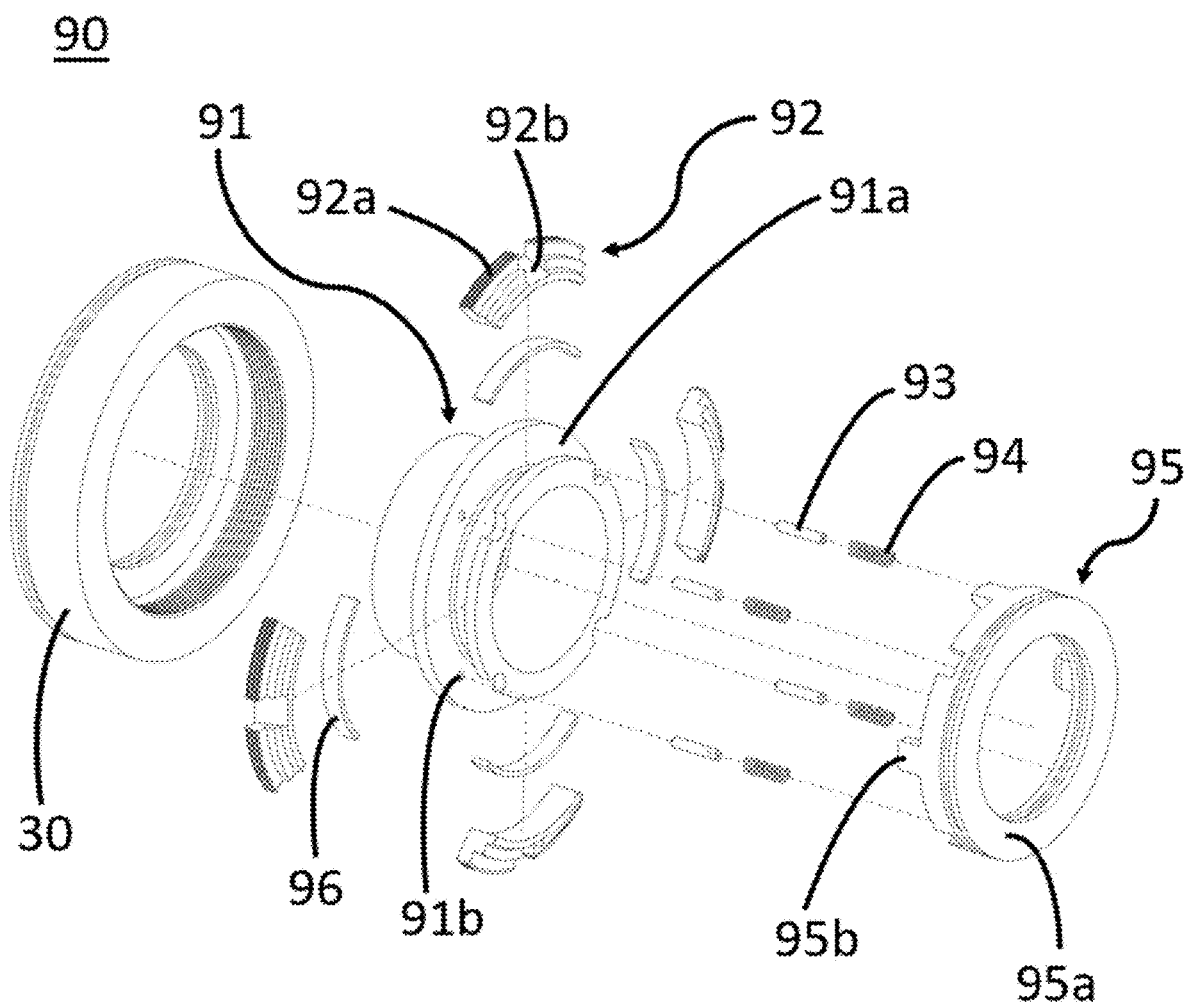
FIG. 21 is a deconstructed view of an exemplary locking mechanism of the present disclosure.

Referring to FIG. 21, a dissected view of an exemplary locking mechanism 90 is shown. Locking mechanism 90 includes a piston 30 having teeth or ridges around the inner circumference. As described elsewhere herein, a piston 30 may be used to engage the circumferential seal element 24 into the activated state. In other embodiments, the circumferential seal element 24 may itself comprise the teeth or ridges, and a piston 30 may or may not be present. The teeth or ridges on piston 30 provide a surface onto which other components of the locking mechanism 90 may engage to lock the circumferential seal element 24 in the activated state.

Locking mechanism 90 further comprises a circumferential cartridge 91 around which are provided a number of dogs 92. In an embodiment, there may be 2, 3, 4, 5, or more dogs 92. In a particular embodiment, there are four dogs 92 equally spaced around the circumferential cartridge 91 (see FIG. 21). In the embodiment of FIG. 21, the dogs 92 do not go around the entire circumference of the circumferential cartridge 91, but rather there are gaps between each dog 92. These gaps allow a space for an alignment component to pass between, such as for example a guide pin 93 and coil spring 94 extending from wall 91a on the circumferential cartridge 91 to a release ring 95. One end of the guide pin 93 may be received by a guide hole 91b in wall 91a of the circumferential cartridge 91. A constant outwardly directed force may be applied to the dogs 92 by a biasing component, such as for example a leaf spring 96 positioned between each dog 92 and the circumferential cartridge 91. The dogs 92 include outwardly oriented teeth or ridges 92a capable of interacting with the corresponding teeth or ridges on the piston 30, and thereby locking the piston 30 in position. The dogs 92 may also comprise a ramped contact surface 92b.

Figure 23:
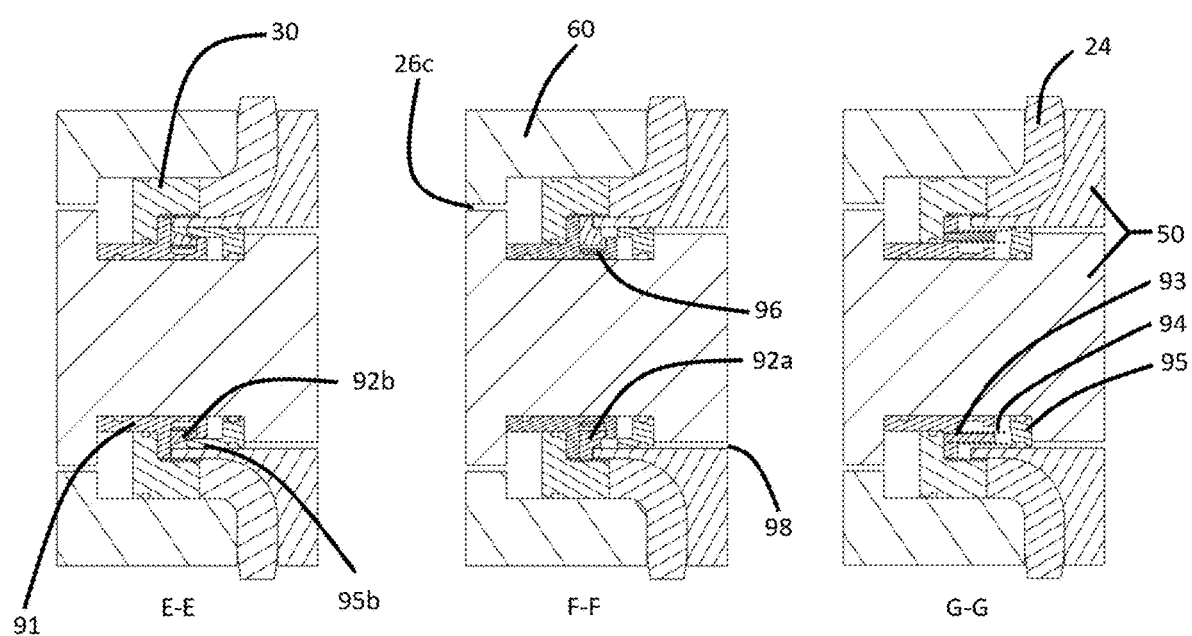
FIG. 23 is cross-sectional view of the representative head unit of FIG. 22B along each of lines E-E, F-F and G-G when the circumferential seal element is in an activated state.
Figure 24:
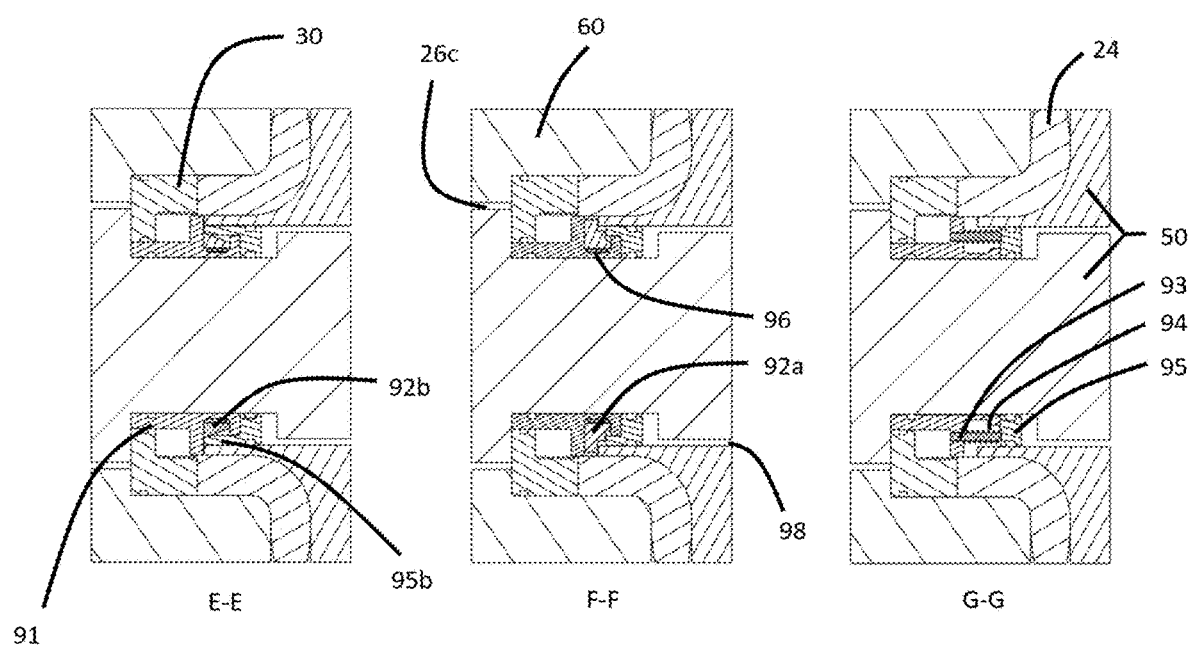
FIG. 24 is cross-sectional view of the representative head unit of FIG. 22B along each of lines E-E, F-F and G-G when the circumferential seal element is in a de-activated state.
Figure 25:
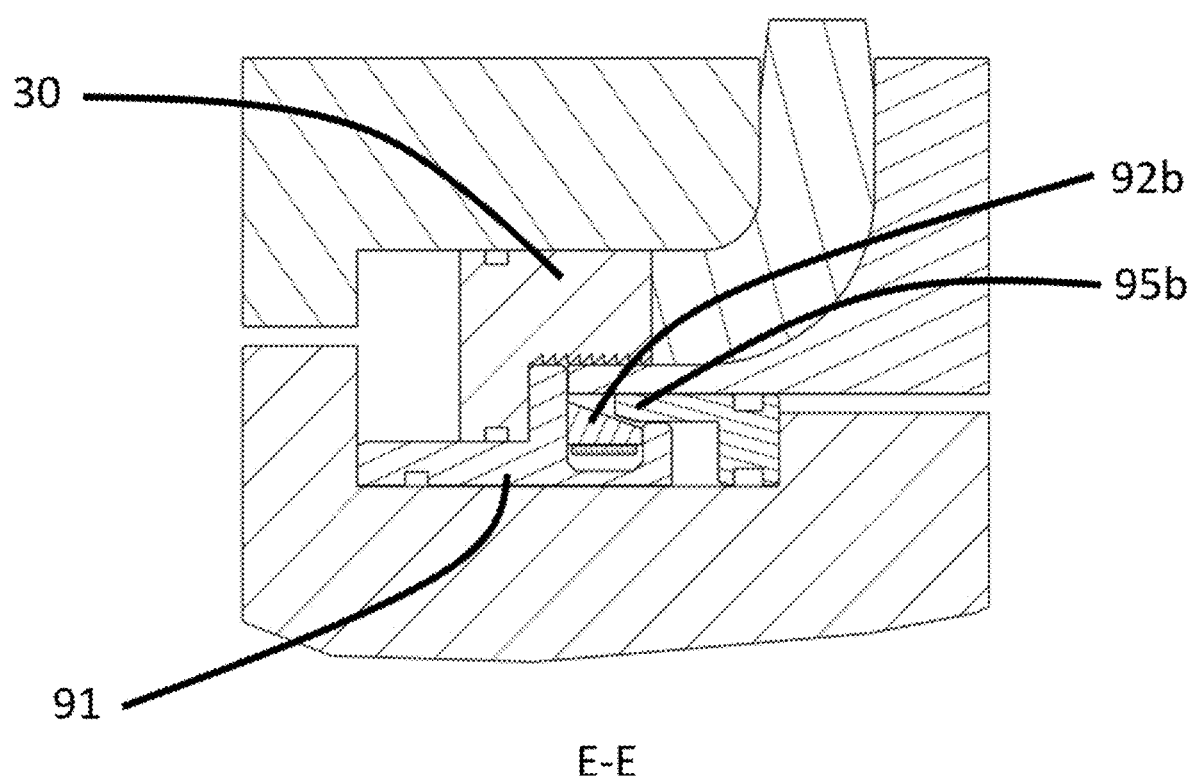
FIG. 25 is a detailed expanded view of the locking mechanism as depicted in E-E in FIG. 23.
Figure 26:
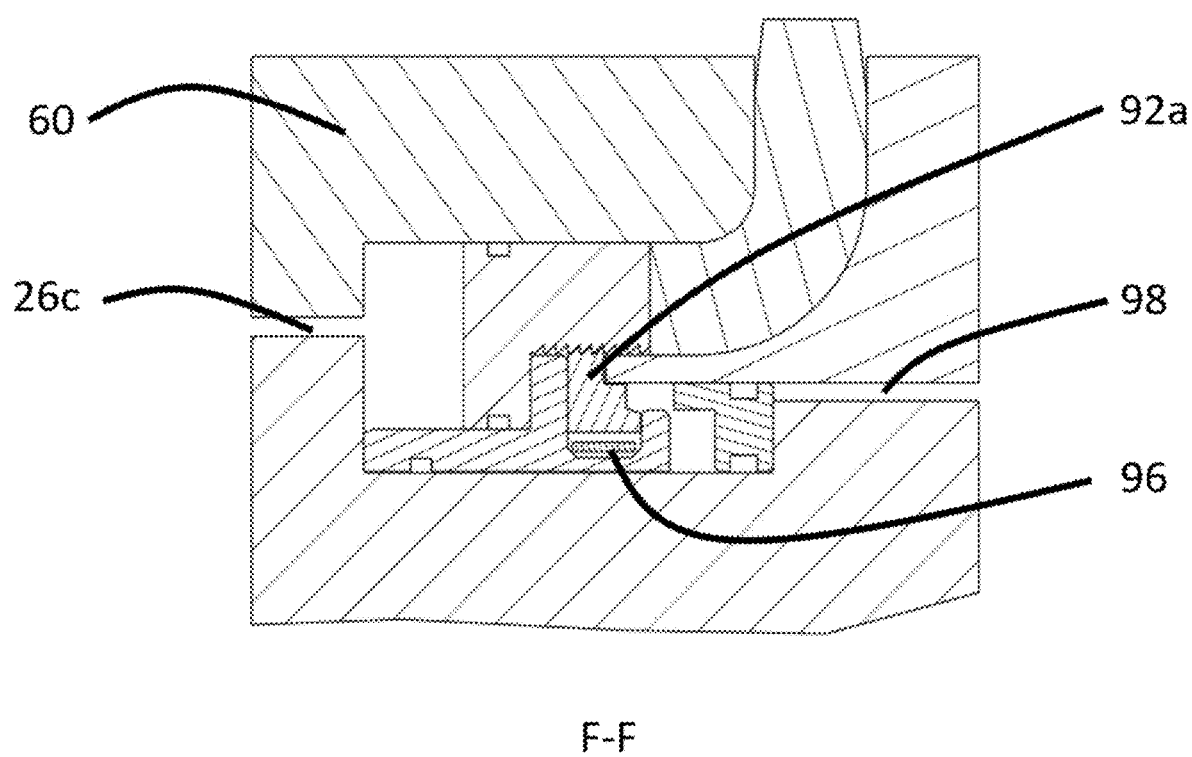
FIG. 26 is a detailed expanded view of the locking mechanism as depicted in F-F in FIG. 23.
Figure 27:
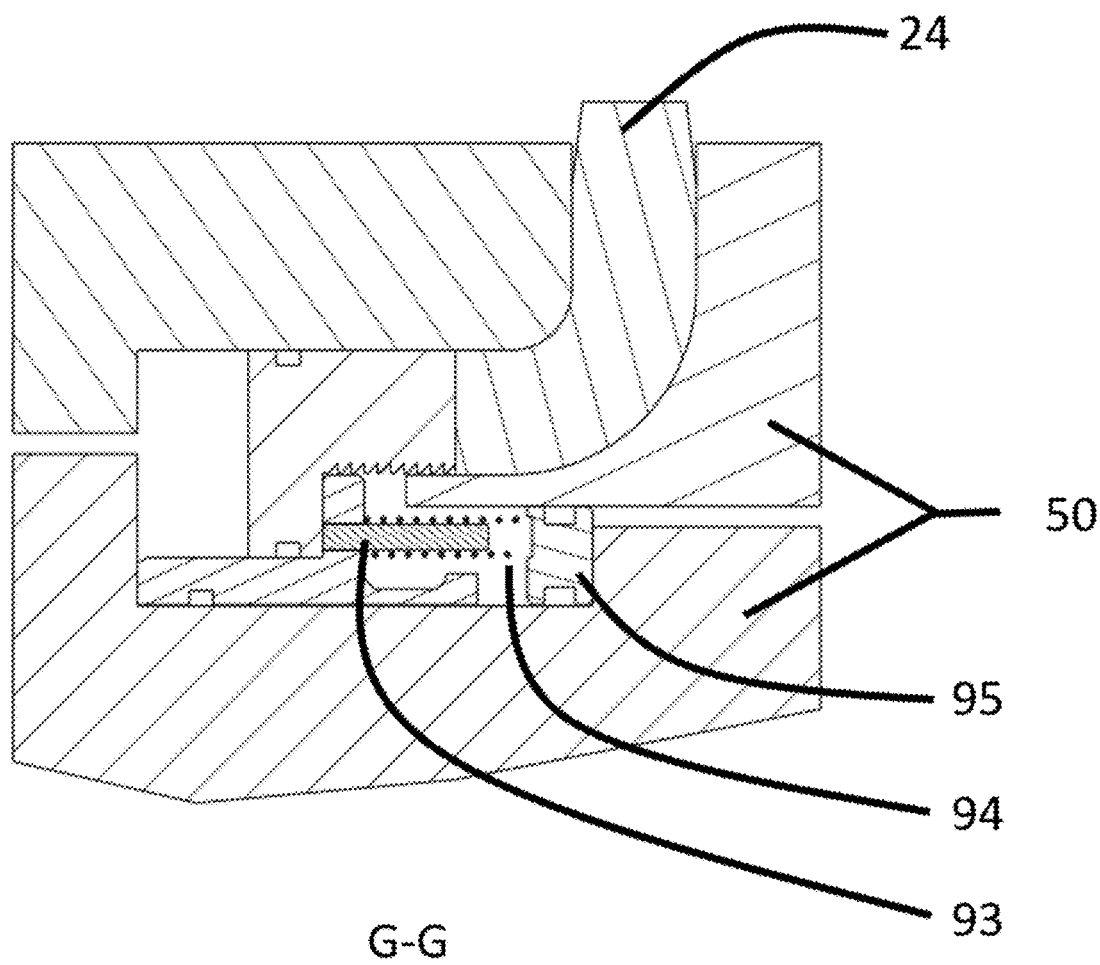
FIG. 27 is a detailed expanded view of the locking mechanism as depicted in G-G in FIG. 23.
Figure 28:
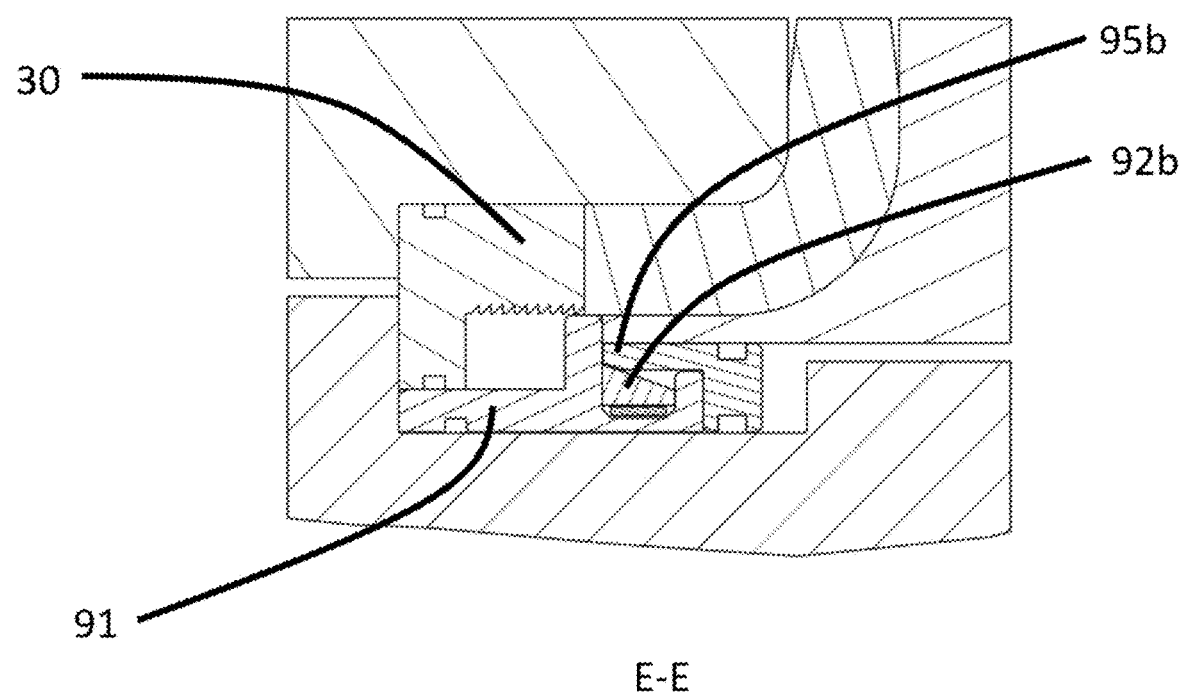
FIG. 28 is a detailed expanded view of the locking mechanism as depicted in E-E in FIG. 24.
Figure 29:
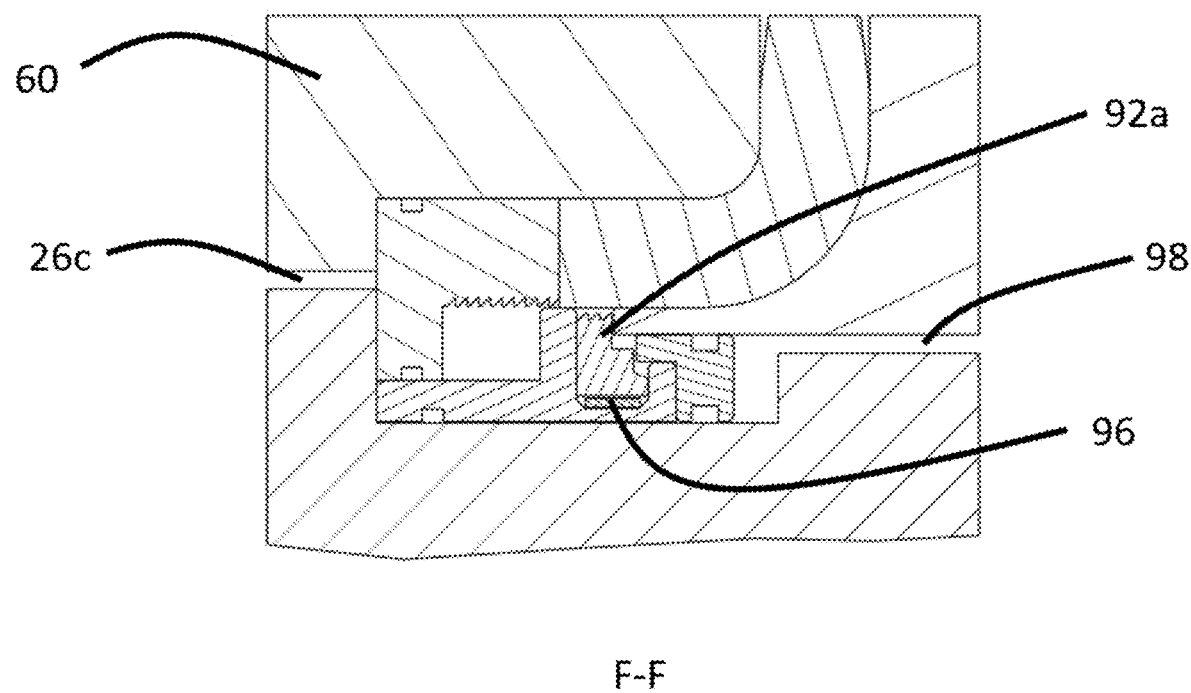
FIG. 29 is a detailed expanded view of the locking mechanism as depicted in F-F in FIG. 24.
Figure 30:
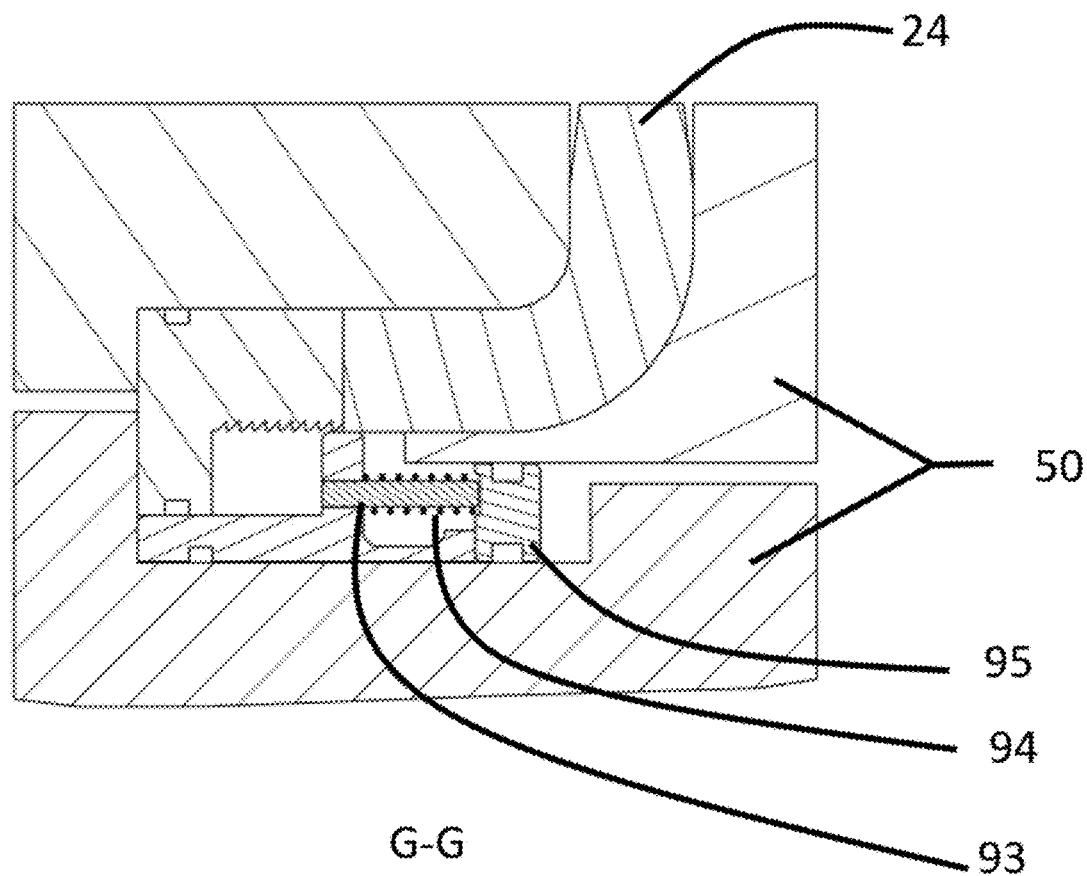
FIG. 30 is a detailed expanded view of the locking mechanism as depicted in G-G in FIG. 24.

To bias the dogs 92 to a retracted position, a force may be applied to an external surface 95a of the release ring 95 to cause the release ring 95 to slide. On sliding movement, a ramped protrusion 95b of the release ring 95 contacts the corresponding ramped contact surface 92b on the dog 92 to retract the dog 92 against the force of the leaf spring 96 and thereby disengage the teeth or ridges 92a from the piston 30. Operation of locking mechanism 90 is further described below with reference to FIGS. 22-24.

Figure 22A:
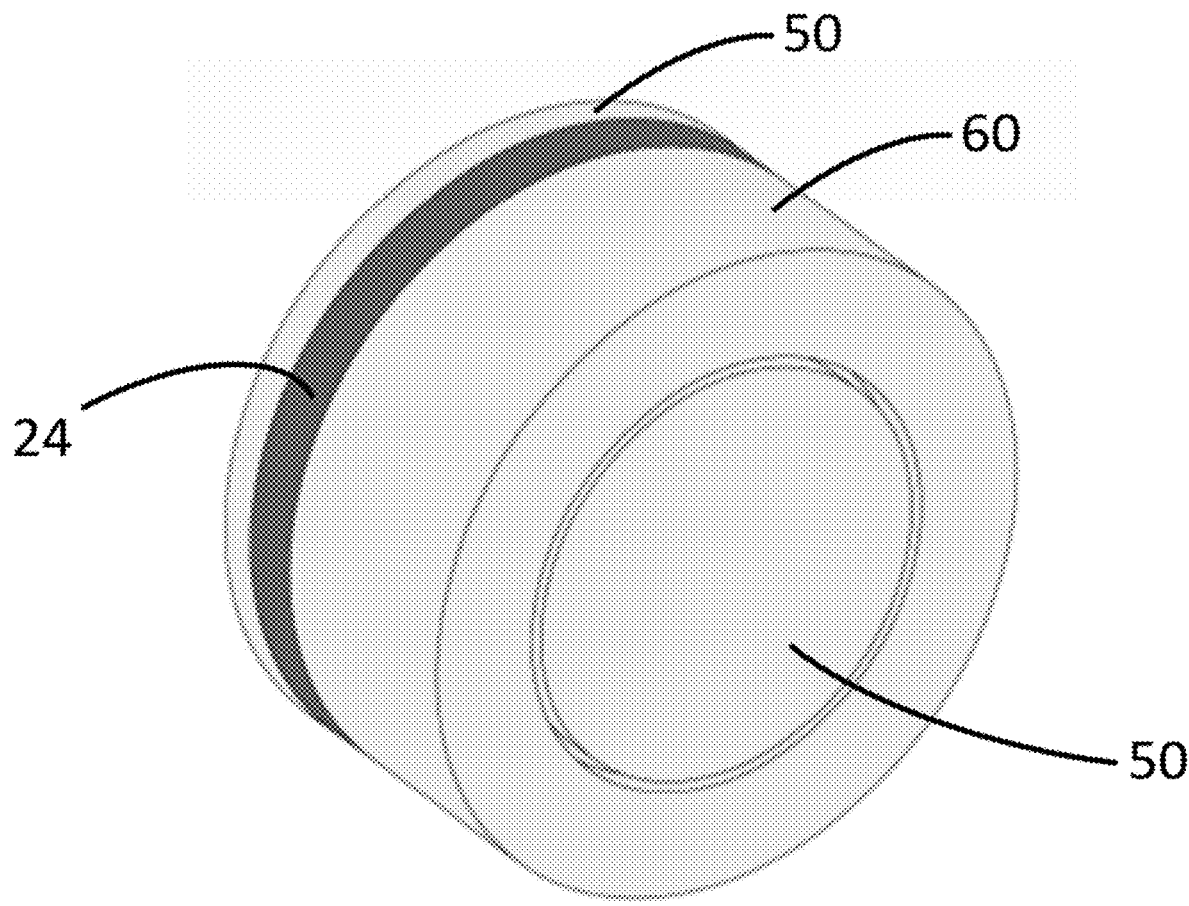
FIGS. 22A-B are graphic representations of head unit components for purposes of describing an exemplary locking mechanism of the present disclosure, whereby
Figure 22B:
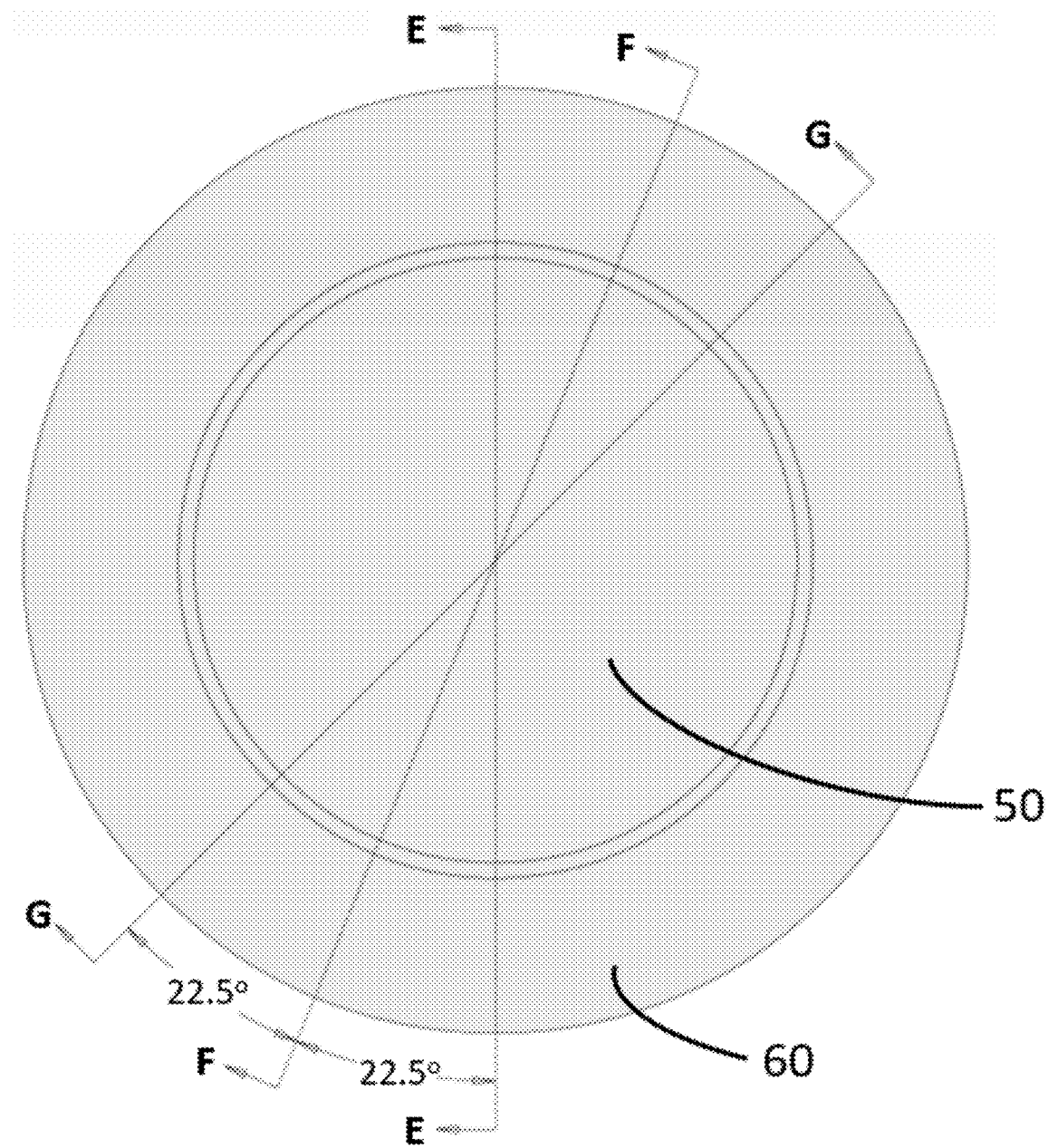

Referring to FIGS. 22A and 22B, as described elsewhere, in some embodiments the head unit 20 of the line-stopping tool 10 may comprise a casing 60 and an internal member 50. For purposes of further describing locking mechanism 90, FIGS. 22A and 22B show a representation of these structures, together with the circumferential seal element 24 received therein. FIGS. 22A and 22B are not intended to show a functional head unit 20, but rather give context to the location and orientation of locking mechanism 90 shown in FIG. 21.

Turning now to FIGS. 23 and 25-27, a cross-sectional view along each of cross-sections E-E, F-F and G-G of FIG. 22B is shown when the circumferential seal element 24 is in an activated (i.e. radially expanded) state. Fluid conduit 26c within the head unit 20 is hydraulically pressurized, which has caused piston 30 to translate right and thereby caused circumferential seal element 24 to extrude along the curvature 22c. Coil spring 94 applies constant spring force to release ring 95 and keeps release ring 95 pushed to the right. Release conduit 98 is not pressurized. For locking the piston 30 in place, leaf spring 96 applies constant outward spring force on the dog 92. The teeth on the piston 30 and the teeth 92a on the dogs 92 are angled so that engagement only happens as the piston 30 slides left. As the piston 30 slides right, it causes the dog 92 to move down and up slightly because the teeth are sliding past each other. This results in piston 30 experiencing a "ratchet" effect. If unexpected pressure loss occurs in fluid conduit 26c, then piston 30 would be locked by engagement of the teeth on the piston 30 with the teeth 92a on the dogs 92, with the dogs 92 ultimately keeping the circumferential seal element 24 activated (i.e. radially expanded).

Based on the material of which circumferential seal element 24 is made it does not want to remain extruded so it will apply constant force against piston 30 during extrusion. Piston 30 is locked in position when there is engagement of the teeth on the piston 30 with the teeth 92a on the dogs 92. This engagement can occur at a number of positions since piston 30 has more teeth than the teeth 92a on the dogs 92 (e.g. to allow for the "ratcheting" effect).

Turning now to FIGS. 24 and 28-30, a cross-sectional view along each of cross-sections E-E, F-F and G-G of FIG. 22B is shown when the circumferential seal element 24 is in a de-activated (i.e. retracted or not radially expanded) state. To allow for de-activation of circumferential seal element 24, release conduit 98 is pressurized which causes release ring 95 to overcome the spring force of coil spring 94 and slide toward the circumferential cartridge 91. As the pressure acts on external surface 95a of the release ring 95 to cause the release ring 95 to slide towards the circumferential cartridge 91, the ramped protrusions 95b push the dogs 92 down via the ramped contact surface 92b. This allows the teeth 92a of the dogs 92 to disengage from the teeth of the piston 30. The pressure in fluid conduit 26c is gradually released, thereby allowing piston 30 to slide back further into groove 22 and the circumferential seal element 24 to retract.

As will be described further below, methods of employing the line-stopping tool 10 of the present disclosure are also improved in comparison to other available tools, which are more complex and may not meet the full criteria of a DBB or DIB isolation system.

Methods

In another aspect, the present disclosure provides methods for isolating a section of a pipe or a vessel. By "isolating a section of pipe", it is meant plugging or sealing off a section of pipe such that pipeline products (fluids, gases or other substances) are prevented from entering the isolated section. Similarly, by "isolating a section of a vessel" it is meant plugging or sealing off a section or portion of the vessel such that products are prevented from entering the isolated section. While the methods discussed herein are in the context of line-stopping applications, it will be appreciated that other applications are equally applicable.

In an embodiment, a section of pipe may be isolated from both sides by employing a line-stopping tool of the present disclosure at each end of the isolated section. This would involve two line-stops and, as discussed above, the pipeline payload could be transferred to an alternate (e.g. temporary) pipeline to bypass the isolated section. In another embodiment, the section of pipe may be isolated at only one end of the section of pipe, typically the side from which the pipeline products flow.

As used herein, "isolating" may be used interchangeably with "stopping". Thus, reference herein to a "line-stopping tool" is equivalent to a "line-isolation tool". Both terms mean a tool for plugging or sealing off a section of pipe.

Although the line-stopping tool 10 may be used for lengthy periods of time to isolate a section of pipe, the methods disclosed herein are typically for temporary isolation of a section of pipe, e.g. while maintenance or other activities are performed downstream of the line-stopping tool 10. However, in some embodiments, the head unit 20 of the isolation tool disclosed herein could be disconnect from the launch equipment (e.g. carrier unit) and left in place for long periods of time or permanently.

In some embodiments herein, the methods of isolating a section of pipe involve inserting a head unit 20 of the line-stopping tool 10 as described herein into a pipe 200, such as for example through an opening in a wall of the pipe. In an embodiment, the head unit 20 comprises two of the circumferential seal elements 24. In another embodiment, a different line-stopping tool may be used or adapted to use the head unit 20 as described herein. In an alternative embodiment, a different line-stopping tool may be used or adapted to use one or more circumferential seal elements 24 of the present disclosure.

In an embodiment, the method of isolating a section of a pipe or a vessel comprises the steps of: inserting a head unit of an isolation tool into a pipe or a vessel, the head unit comprising: (i) at least one groove around a circumference of the head unit, each of the at least one grooves comprising a first end within the head unit, a second end open to the exterior of the head unit, and a curvature therebetween; and (ii) a circumferential seal element disposed within each of the at least one grooves and spanning at least a portion of the curvature; and providing a force at the first end of the at least one groove to impart radial expansion of the circumferential seal element at the second end to engage the circumferential seal element against the pipe or vessel and thereby isolate the section of the pipe or vessel.

In an embodiment, the line-stopping tool 10 is further defined as disclosed herein. In an embodiment, the at least one groove 22 is two grooves 22, and the head unit 20 comprises a separate fluid conduit 26 in fluid communication with each of the two grooves. In an embodiment, the step of providing the force to impart radial expansion of each circumferential seal element of the two grooves is independent of the other. In other embodiments, the step of providing the force to impart radial expansion of each circumferential seal element of the two grooves is dependent on the other.

In an embodiment, the force is a mechanical force. In such embodiments, providing the mechanical force may comprise rotating a threaded ring disposed within the at least one groove to shift the circumferential seal element and impart the radial expansion. The skilled person will appreciate that other methods of providing the mechanical force may be used. In an embodiment, the at least one groove is two grooves. The mechanical force to impart radial expansion of each circumferential seal element of the two grooves may be independently imparted.

Line-stopping will now be described further with reference to FIGS. 11-16. In use, a line-stop is performed by any appropriate method by employing a line-stopping tool with a head unit 20 of the present disclosure, such as by a hot-tap or by connection through an existing branch.

Figure 11:
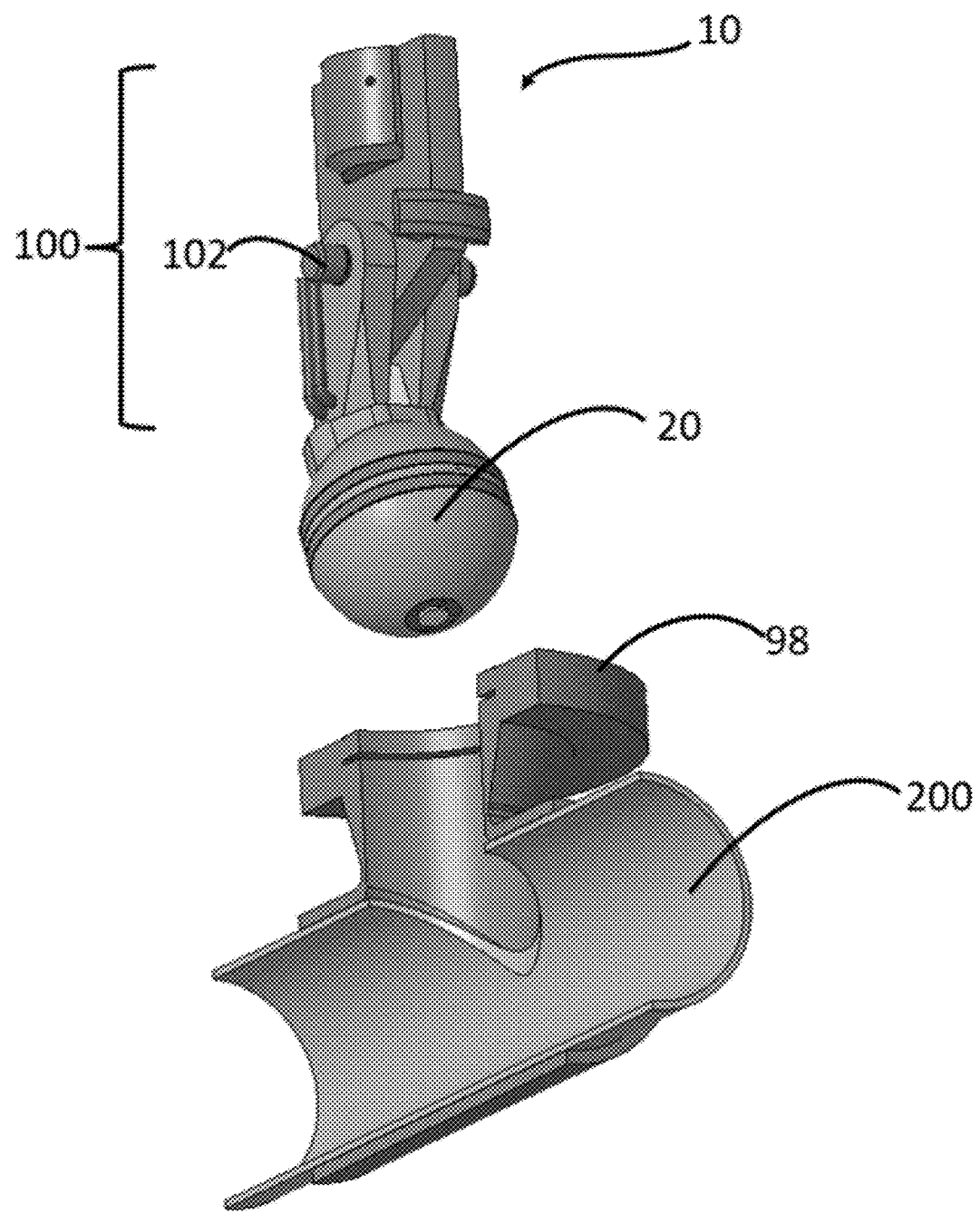
FIG. 11 is a view of a line-stopping tool of the present disclosure approaching an opening in the wall of a pipe.

A hot-tap may be performed as is well-known in the art. In an exemplary hot-tap procedure, an access connection 98 (e.g. flanged saddle) is fitted to a live pipe 200 (FIG. 11). A temporary valve and access pipe (not shown) may be bolted to the access connection 98. The temporary valve prevents leakage from the live pipe after tapping (e.g. drilling) into the pipe. The tapping tool itself is likewise configured to prevent leakage during pipe cutting and upon removal the temporary valve is closed to complete the branch connection.

Figure 13:
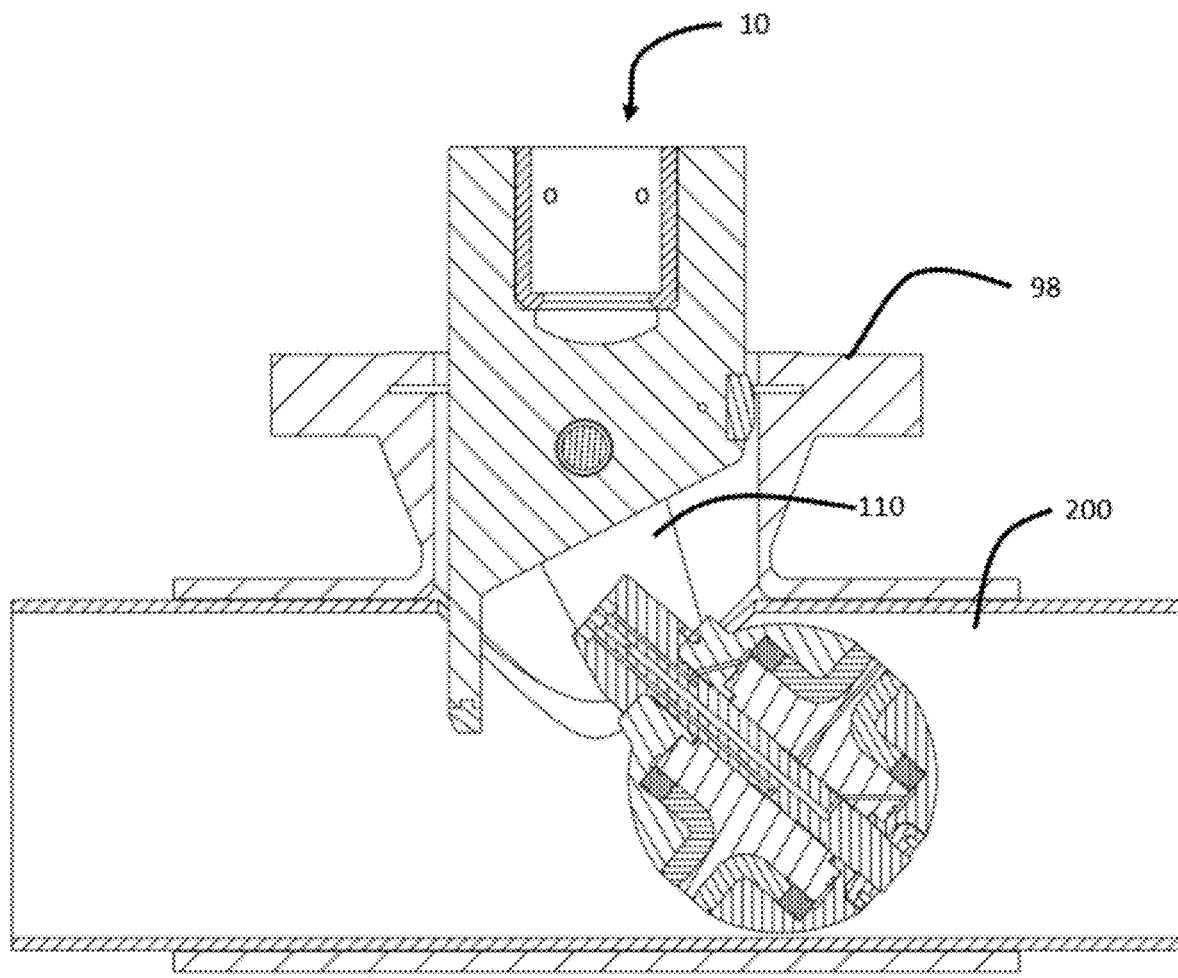
FIG. 13 is a view of the line-stopping tool of the present disclosure as it transitions into the pipe.

After the hot-tap, and referring to the embodiments shown in FIGS. 11-15, line-stopping tool 10 approaches the access connection 98 (FIG. 11) travels downwardly through access connection 98 (FIG. 12) until the head unit 20 (or wheel assembly 90 connected thereto; not shown) contacts a bottom portion of the pipe 200 (FIG. 13). When traveling down the access pipe (not shown), the carrier unit 100 and head unit 20 are aligned substantially longitudinally with each other. The circumferential seal elements 24 are in a de-activated (i.e. retracted or not radially expanded) state. As the line-stopping tool 10 is advanced down the access pipe and through the access connection 98, contact between the head unit 20 (or wheel assembly 90 connected thereto; not shown) and the wall of the pipe causes the head unit 20 to pivot about the carrier unit 100 (FIG. 13).

Downward transfer service (e.g. by a hydraulic cylinder ram) continues from above and soon the head unit is positioned within the pipe 200 (FIG. 14). Notably, the branch connection need not be at 90 degrees. It could be at an angle as well. The head unit 20 can be centered inside the pipe 200 using additional components and/or geometry, or the head unit 20 may simply be left resting on the inside wall of the pipe 200 at a slight angle.

With the head unit 20 positioned within the pipe 200, the circumferential seal elements 24 may be activated by providing a force at or near the first end 22a of each respective groove 22 via a fluid conduit 26. In an embodiment, the force is provide by a fluid medium. In an embodiment, the fluid medium is a hydraulic fluid as described elsewhere herein. In a preferred embodiment, separate fluid conduits 26 communicate with each first end 22a of a respective groove 22 such that each circumferential seal element 24 can be independently activated (FIG. 14). The delivery of the force causes movement of the circumferential seal element 24 within the groove and, through the curvature 22c, the seal portion 24a expands radially outwards to engage the wall of the pipe 200 (FIG. 15). In an embodiment, the carrier unit 100 transfers the pipeline pressure loads to the pipe and anchors itself without creating any substantial additional loading. In an embodiment, the launch equipment can be disconnected and the carrier unit 100 would continue to hold the head unit 20 in position.

When the head unit comprises two or more circumferential seal elements 24, the seals may be activated at the same time, sequentially or in an alternating pattern of partially activating one and then the other until each is fully activated. The skilled person will appreciate that any order and combination of steps may be used to activate the circumferential seal elements 24. In an embodiment, the most upstream circumferential seal element 24 is activated first and after it has engaged the wall of the pipe 200, a second downstream circumferential seal element 24 on the head unit 20 is activated. This order of activation may be preferred when the line-stopping tool 10 is positioned in an operational pipeline. In an alternate embodiment, both of the circumferential seal elements 24 are activated simultaneously to engage the seal portions 24a thereof against the pipe 200. This simultaneous mode of activation may be preferred in pipelines that are not operational when the line-stopping tool 10 is installed. In an alternate embodiment, the circumferential seal elements 24 are activated in a "walked-up" or "step-wise" fashion, meaning that each seal portion 24a of a circumferential seal element 24 is radially expanded gradually, alternating between the seals with incremental increases in the delivery of force to each first end 22a of the groove 22 at each step.

In the methods disclosed herein, the step of providing a force, such as for example a force provided by a fluid medium, may be repeated at any time for any one or more of the circumferential seal elements 24 in any order. This step may be performed to maintain the sealing engagement of the seal portion 24a against the wall of the pipe 200 if an insufficient sealing engagement is observed at any time during operation of the line-stopping tool 10. This step may also be performed if it is desired to de-activate and re-activate a circumferential seal element 24 at any time during operation. For instance, it may be desirable to move the line-stopping tool within the pipe 200 or to allow pipeline products to flow past the seal to test repairs on the downstream isolated section.

In an embodiment, the methods disclosed herein may further comprise a step of activating a locking mechanism within the head unit 20 to lock the circumferential seal element 24 in an activated state in which the seal portion 24a of the circumferential seal element 24 is sealingly engaged against the pipe. The locking mechanism may be the locking mechanism as described elsewhere herein.

As described elsewhere herein, the head unit 20 may comprise a bleed port 70 and a bleed conduit 72. Thus, in further embodiments of the methods disclosed herein, the bleed port 70 and bleed conduit 72 may be used to bleed pressure and/or fluid from the interior space of the pipe between the circumferential seal elements 24. This may be done for several reasons. Firstly, in the event of a seal failure and leak of pipeline products into the interior space between the seals, the bleed port 70 and bleed conduit 72 may be used to bleed the pipeline products and pressure therefrom. In such embodiments, the line-stopping tool 10 disclosed herein functions as a DBB or DIB line-stopping tool. Secondly, in some embodiments, it may be desirable to create a vacuum within the interior space by bleeding pressure therefrom.

It will be apparent to those skilled in the art that an embodiment of the line-stopping tool 10 of the present disclosure provides two bi-directional circumferential seal elements 24 within a single head unit 20 (e.g. DIB embodiments). By "bi-directional", it is meant that pipeline pressures and fluids may be isolated from both directions within the pipe 200 without removing and re-inserting the isolation tool in the opposition orientation in the pipe 200. This may serve to reduce operation time and cost involved with isolating a section of pipe.

While the term "upstream" has been used generally throughout to refer to the operational side of the site of isolation (i.e. the side where pipeline products would be present), it is possible that the line-stopping tool 10 of the present disclosure could be used in the alternate orientation. Likewise, the term "downstream" has been used to refer to the isolated side of the site of isolation, this side could likewise have pipeline products therein at any given time during operation.

It will also be apparent to those skilled in the art that while exemplary methods and steps have been described, the line-stopping tool 10 and circumferential seal elements 24 of the present application are of broad application in providing hot-tapping and subsequent line-stopping services, and the skilled person would appreciate other uses and methods for employing the line-stopping tools 10 and head unit 20 disclosed herein.

In an embodiment, the present disclosure provides a method of engaging a seal against a wall of a pipe wall or a vessel, the method comprising imparting a linear force within a fixed space and in an axial or tangential direction to a circumferential seal element, to impart radial expansion of the circumferential seal element via a curvature within the fixed space. In an embodiment, the fixed space is a groove. By "linear force" it is meant a force in a single direction or substantially in a single direction. By "axial or tangential direction" it is meant that the force is in a direction that is different from the plane of the radial expansion. In an embodiment, linear force is imparted perpendicular or substantially perpendicular to the plane of radial expansion. The groove may be a groove as described herein or any other suitable groove.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Many obvious variations of the embodiments set out herein will suggest themselves to those skilled in the art in light of the present disclosure. Such obvious variations are within the scope of the appended claim.

The invention claimed is:

1. An isolation tool for isolating a section of a pipe or a vessel, the isolation tool comprising:
   a head unit configured for location in a section of a pipe or a vessel, the head unit comprising:
      one or more grooves around a circumference of the head unit, each of the one or more grooves comprising a first end within the head unit, a second end open to the exterior of the head unit, and a curvature therebetween, the curvature being a bend formed by opposing and complementarily oriented walls of the groove, with one of the walls having a larger radius of curvature than the other to form the bend; and
      a circumferential seal element disposed within each of the one or more grooves and spanning at least a portion of the curvature;
      wherein the circumferential seal element is configured within the groove such that a force at or near the first end of the groove imparts radial expansion of the circumferential seal element at the second end of the groove via the curvature in the groove, and
      wherein the circumferential seal element is slidably moved along or pushed through the curvature by the force to impart the radial expansion.

2. The isolation tool of claim 1, wherein the curvature of each of the one or more grooves is a bend forming an angle between about 60 degrees and about 120 degrees.

3. The isolation tool of claim 1, wherein the bend in the curvature of each of the one or more grooves is a bend forming an angle between about 80 degrees and about 100 degrees.

4. The isolation tool of claim 1, wherein the curvature of each of the one or more grooves is a bend forming a 90 degree corner.

5. The isolation tool of claim 1, wherein the curvature of each of the or more grooves is a bend having an inner radius of curvature of between about 0.2 inches and about 0.5 inches; and an outer radius of curvature of between about 1.0 inches and 1.5 inches.

6. The isolation tool of claim 1, wherein the one or more grooves narrow at the second end.

7. The isolation tool of claim 1, wherein the one or more grooves have a uniform width from the first end to the second end.

8. The isolation tool of claim 7, wherein the uniform width is between 0.5 inches and 2.0 inches.

9. The isolation tool of claim 1, wherein the circumferential seal element comprises:
   a seal portion for engaging the pipe or the vessel upon activation; and
   a seal engagement portion for receiving the force, the seal engagement portion located proximal to the first end of the groove relative to the seal portion.

10. The isolation tool of claim 9, wherein the seal engagement portion and seal portion of the circumferential seal element are dimensioned to contact each other within the first end or the curvature of the groove to impart radial expansion of the seal portion.

11. The isolation tool of claim 9, wherein the circumferential seal element is a single unit comprising the seal engagement portion and the seal portion.

12. The isolation tool of claim 9, wherein the seal engagement portion and seal portion of the circumferential seal element are dimensioned to contain a medium therebetween, wherein the medium is a fluid and the force acting upon the seal engagement portion is transferred to the seal portion via the medium to impart radial expansion of the seal portion.

13. The isolation tool of claim 1, wherein the circumferential seal element conforms to the shape of the groove over the entire circumferential seal element disposed within the groove.

14. The isolation tool of claim 1, wherein the one or more grooves are two grooves and the isolation tool is configured such that radial expansion of the circumferential seal element of each of the two grooves can be independently activated.

15. The isolation tool of claim 14, which comprises a bleed port open to the exterior of the head unit between the two grooves, the bleed port in fluid communication with a bleed conduit within the head unit.

16. The isolation tool of claim 1, wherein radial expansion of the circumferential seal element is reversible upon release of the force.

17. The isolation tool of claim 1, wherein the force is a fluid force.

18. The isolation tool of claim 17, wherein the head unit comprises a fluid conduit in fluid communication with the first end of the groove and configured for providing the fluid force to impart radial expansion of the circumferential seal element at the second end.

19. The isolation tool of claim 18, wherein the head unit comprises a piston disposed within the groove between the fluid conduit and the circumferential seal element.

20. The isolation tool of claim 19, wherein the head unit comprises a locking mechanism for releasably locking the piston in an activated position.

21. The isolation tool of claim 20, wherein radial expansion of the circumferential seal element is reversible upon release of the locking mechanism.

22. The isolation tool of claim 1, wherein the force is a mechanical force.

23. The isolation tool of claim 22, wherein the head unit comprises a threaded ring disposed within each of the one or more grooves, wherein the threaded ring travels on threads in the groove to shift the circumferential seal element between an activated and deactivated state.

* * * * *